US009733978B2

(12) United States Patent
Suarez Gracia et al.

(10) Patent No.: US 9,733,978 B2
(45) Date of Patent: Aug. 15, 2017

(54) DATA MANAGEMENT FOR MULTIPLE PROCESSING UNITS USING DATA TRANSFER COSTS

(71) Applicant: QUALCOMM Incorporated, San Diego, CA (US)

(72) Inventors: Dario Suarez Gracia, Palo Alto, CA (US); Tushar Kumar, San Francisco, CA (US); Aravind Natarajan, Sunnyvale, CA (US); Ravish Hastantram, San Jose, CA (US); Gheorghe Calin Cascaval, Palo Alto, CA (US); Han Zhao, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/837,156

(22) Filed: Aug. 27, 2015

(65) Prior Publication Data

US 2017/0060633 A1    Mar. 2, 2017

(51) Int. Cl.
*G06F 9/46*         (2006.01)
*G06F 15/173*       (2006.01)
(Continued)

(52) U.S. Cl.
CPC .............. *G06F 9/48* (2013.01); *G06F 9/4806* (2013.01); *G06F 9/4831* (2013.01);
(Continued)

(58) Field of Classification Search
None
See application file for complete search history.

(56) References Cited

U.S. PATENT DOCUMENTS 6,480,876 B2 * 11/2002  Rehg .................... G06F 9/5066
                                                 709/231
6,675,189 B2 *  1/2004  Rehg .................... G06N 99/005
                                                 709/231

(Continued)

OTHER PUBLICATIONS

Fisher N., et al., "Thermal-Aware Global Real-Time Scheduling on Multicore Systems," Feb. 3, 2010, 45 pages.

(Continued)

*Primary Examiner* — Charles Swift
(74) *Attorney, Agent, or Firm* — The Marbury Law Group, PLLC

(57) ABSTRACT

Various embodiments include methods for data management in a computing device utilizing a plurality of processing units. Embodiment methods may include generating a data transfer heuristic model based on measurements from a plurality of sample data transfers between a plurality of data storage units. The generated data transfer heuristic model may be used to calculate data transfer costs for each of a plurality of tasks. The calculated data transfer costs may be used to schedule execution of the plurality of tasks in an execution order on selected ones of the plurality of processing units. The data transfer heuristic model may be updated based on measurements of data transfers occurring during the executions of the plurality of tasks (e.g., time, power consumption, etc.). Code executing on the processing units may indicate to a runtime when certain data blocks are no longer needed and thus may be evicted and/or pre-fetched for others.

26 Claims, 8 Drawing Sheets

(51) Int. Cl.
| | |
|---|---|
| G06F 1/00 | (2006.01) |
| G06F 9/48 | (2006.01) |
| G06F 9/50 | (2006.01) |
| G06F 12/0806 | (2016.01) |
| G06F 12/0862 | (2016.01) |
| G06F 12/12 | (2016.01) |
| G06F 11/34 | (2006.01) |

(52) U.S. Cl.
CPC .......... *G06F 9/4837* (2013.01); *G06F 9/4843* (2013.01); *G06F 9/4881* (2013.01); *G06F 9/4893* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5038* (2013.01); *G06F 9/5044* (2013.01); *G06F 9/5055* (2013.01); *G06F 9/5083* (2013.01); *G06F 9/5094* (2013.01); *G06F 11/3419* (2013.01); *G06F 11/3466* (2013.01); *G06F 12/0806* (2013.01); *G06F 12/0862* (2013.01); *G06F 12/12* (2013.01); *G06F 2212/62* (2013.01)

(56) References Cited

U.S. PATENT DOCUMENTS

| | | | |
|---|---|---|---|
| 7,886,172 B2 | 2/2011 | Bose et al. | |
| 8,276,164 B2 | 9/2012 | Munshi et al. | |
| 8,468,507 B2 | 6/2013 | Agarwal et al. | |
| 8,510,741 B2 | 8/2013 | Leiserson et al. | |
| 8,533,716 B2 | 9/2013 | Lippett et al. | |
| 8,566,537 B2 | 10/2013 | Ni et al. | |
| 8,572,622 B2 | 10/2013 | Alexander et al. | |
| 8,707,314 B2 | 4/2014 | Gummaraju et al. | |
| 8,782,645 B2 | 7/2014 | Breternitz et al. | |
| 8,892,931 B2 | 11/2014 | Kruglick | |
| 8,954,986 B2 | 2/2015 | Rajagopalan et al. | |
| 2009/0204765 A1* | 8/2009 | Gupta | G06F 12/121 711/133 |
| 2010/0161828 A1* | 6/2010 | Hiltunen | G06F 17/30 709/232 |
| 2011/0035078 A1* | 2/2011 | Jackson | G06F 1/3203 700/300 |
| 2011/0107341 A1* | 5/2011 | Longobardi | G06F 9/5033 718/102 |
| 2011/0173038 A1* | 7/2011 | Moon | G06F 9/5072 705/7.12 |
| 2012/0079298 A1 | 3/2012 | Majumdar et al. | |
| 2012/0130554 A1* | 5/2012 | Jain | G06F 1/329 700/291 |
| 2012/0131591 A1* | 5/2012 | Moorthi | G06Q 30/00 718/104 |
| 2012/0192195 A1* | 7/2012 | El-Moursy | G06F 9/4893 718/103 |
| 2012/0263125 A1 | 10/2012 | Tejaswini et al. | |
| 2013/0139170 A1* | 5/2013 | Prabhakar | G06F 9/4893 718/104 |
| 2014/0006534 A1* | 1/2014 | Jain | G06F 9/5094 709/208 |
| 2014/0006666 A1 | 1/2014 | Hiraki et al. | |
| 2014/0067994 A1* | 3/2014 | Puttaswamy Naga | H04L 41/0896 709/217 |
| 2014/0215481 A1* | 7/2014 | Piet | G06F 9/5061 718/104 |
| 2014/0282595 A1 | 9/2014 | Lev et al. | |
| 2014/0298347 A1* | 10/2014 | Aylesworth | G06Q 10/0631 718/104 |
| 2015/0067700 A1 | 3/2015 | Kim et al. | |
| 2015/0089249 A1 | 3/2015 | Hannon et al. | |
| 2015/0100971 A1* | 4/2015 | Dube | G06F 9/4881 719/319 |
| 2015/0178138 A1 | 6/2015 | Saha et al. | |
| 2015/0199215 A1* | 7/2015 | Mankovskii | G06F 9/5094 718/102 |

OTHER PUBLICATIONS

Shankar S., et al., "Power-Aware Work Stealing in Homogeneous Multicore Systems," Future Computing 2014: The Sixth International Conference on Future Computational Technologies and Applications, 2014, pp. 40-49.

Benini L., et al., "Allocation, Scheduling and Voltage Scaling on Energy Aware MPSoCs," Integration of AI and OR Techniques in Constraint Programming for Combinatorial Optimization Problems, Lecture Notes in Computer Science, 2006, vol. 3990, 15 pages.

Anonymous: "Garbage Collection (Computer Science)—Wikipedia, the Free Encyclopedia", Jul. 29, 2015 (Jul. 29, 2015), pp. 1-8, XP055303174, Retrieved from the Internet: URL: https://en.wikipedia.org/w/index.php?title=Garbage_collection_(computer_science)&oldid=673705837 [retrieved on Sep. 16, 2016].

Becchi M., et al., "Data-Aware Scheduling of Legacy Kernels on Heterogeneous Platforms with Distributed Memory", Parallelism in Algorithms and Architectures, ACM, 2 Penn Plaza, Suite 701, New York, NY, 10121-0701 USA, Jun. 13, 2010 (Jun. 13, 2010), pp. 82-91, XP058131801, DOI: 10.1145/1810479.1810498, ISBN: 978-1-4503-0079-7.

International Search Report and Written Opinion—PCT/US2016/044168—ISA/EPO—Oct. 6, 2016.

Lee J.H., et al., "HPerf: A Lightweight Profiler for Task Distribution on CPU+FGPU Platforms", Mar. 2, 2015 (Mar. 2, 2015), 14 Pages, XP055301790, Retrieved from the Internet: URL: https://smartech.gatech.edu/bitstream/handle/1853/53198/GT-CS-15-04.pdf?sequence=1 &isAllowed=y [retrieved on Sep. 12, 2016].

Lee J.H., et al., "HPerf: A Lightweight Profiler for Task Distribution on CPU—FGPU Platforms", Mar. 2, 2015 (Mar. 2, 2015), 2 Pages, XP055301844, Retrieved from the Internet: URL: https://smartech.gatech.edu/handle/1853/53198?show=full [retrieved on Sep. 12, 2016].

Phothilimthana P.M., et al., "Portable Performance on Heterogeneous Architectures", PLDI09 : Proceedings of the 2009 ACM Sigplan Conference on Programming Language Design and Implementation, Jun. 15-20, 2009, Dublin, Ireland, [Sigplan Notices: A Monthly Publication of the Special Interest Group on Programming Languages of the As], vol. 48, No. 4, Mar. 16, 2013 (Mar. 16, 2013), pp. 431-444, XP058020391, DOI: 10.1145/2499368.2451162, ISBN: 978-1-60558-392-1.

Pienaar J.A., et al., "MDR: Performance Model Driven Runtime for Heterogeneous Parallel Platforms", Supercomputing, ACM, 2 Penn Plaza, Suite 701, New York, NY, 10121-0701, USA, May 31, 2011 (May 31, 2011), pp. 225-234, XP058003732, DOI: 10.1145/1995896.1995933, ISBN: 978-1-4503-0102-2.

Qualcomm Technologies, et al.,"Qualcomm MARE Enabling Applications for Heterogeneous Mobile Devices", Apr. 23, 2014 (Apr. 23, 2014), XP055301666, URL: https://developer.qualconm.com/qfile/27709/mare-whitepaper.pdf [retrieved on Sep. 15, 2016].

Arun Raman "Efficient Scheduling of Multi-Versioned Tasks", corresponding Qualcomm, unpublished U.S. Appl. No. 14/852,737, filed Sep. 14, 2015. 72 pages includes Filing Receipt, Specification and Drawings as filed.

Han Zhao et al. "Proactive Resource Management for Parallel Work-Stealing Processing Systems", corresponding Qualcomm, unpublished U.S. Appl. No. 14/862,373, filed Sep. 23, 2015. 65 pages includes Filing Receipt, Specification and Drawings as filed.

Han Zhao et al. "Adaptive Chunk Size Tuning for Data Parallel Processing on Multi-core Architecture", corresponding Qualcomm, unpublished U.S. Appl. No. 14/862,398, filed Sep. 23, 2015. 60 pages includes Filing Receipt, Specification and Drawings as filed.

* cited by examiner

ડATA MANAGEMENT FOR MULTIPLE
PROCESSING UNITS USING DATA
TRANSFER COSTS

BACKGROUND

In an ideal multi-core (multi-processor or heterogeneous) system, different included processing units are connected to the same cache hierarchy under the same memory space. However, some multi-processor computing systems may provide coherency only in part of the systems, as implementing full coherency schemes is often very costly. For example, in a system having a central processing unit (CPU), a graphical processing unit (GPU), and a digital signal processor (DSP), only the CPU and GPU may utilize coherency. In many typical systems, each processing unit utilizes its own cache hierarchy and memory space. Data for certain tasks executed by the processing units may be transferred between various memory units in order to enable particular processing units to perform the associated tasks. For example, a CPU may utilize data within a first data store for a first task, a GPU may use data within the first data store and a third data store for a second task, a DSP may use data within the first data store and a second data store for a third task, and the CPU may use data within the first data store and a fourth data store for a fourth task. As each data transfer within a multi-core computing system can require a costly cache flush that includes writes to memory, transferring data for use by different tasks and/or to offload work to various cores often incurs significant overhead costs.

SUMMARY

Various embodiments provide methods, devices, systems, and non-transitory process-readable storage media for data management in a computing device utilizing a plurality of processing units (i.e., a multi-processor computing device). An embodiment method performed by a multi-processor computing device may include operations for generating a data transfer heuristic model based on measurements from a plurality of sample data transfers between a plurality of data storage units, calculating data transfer costs for each of a plurality of tasks using the generated data transfer heuristic model, and configuring the plurality of tasks to be performed on the plurality of processing units based at least on the calculated data transfer costs. In some embodiments, the measurements may include one of time measurements, power consumption measurements, or time and power consumption measurements.

In some embodiments, generating the data transfer heuristic model based on the measurements from the plurality of sample data transfers between the plurality of data storage units may include adjusting a coefficient of a formula that calculates an estimated cost. In some embodiments, the formula may calculate one of an estimated time cost, an estimated power consumption cost, or both an estimated time cost and an estimated power consumption cost.

In some embodiments, the method may further include operations for executing each of the plurality of tasks as configured on one of the plurality of processing units, and updating the data transfer heuristic model based on measurements of data transfers occurring during executions of the plurality of tasks. In some embodiments, generating the data transfer heuristic model may occur at a boot-up time for the computing device or periodically. In some embodiments, generating the data transfer heuristic model may include using embedded power monitoring capabilities of the computing device.

In some embodiments, calculating the data transfer costs for each of the plurality of tasks using the generated data transfer heuristic model may include querying the data transfer heuristic model using a data transfer size, a source identity, and a destination identity. In some embodiments, querying the data transfer heuristic model may be performed via an application programming interface (API) call. In some embodiments, calculating the data transfer costs for each of the plurality of tasks using the generated data transfer heuristic model may include identifying data dependencies between the plurality of tasks. In some embodiments, the data dependencies may be provided via a scheduler.

In some embodiments, configuring the plurality of tasks to be performed on the plurality of processing units based at least on the calculated data transfer costs may include prioritizing the plurality of tasks based on the calculated data transfer costs to obtain a scheduling priority order. In some embodiments, the method may further include operations for executing a first task in the scheduling priority order on a first processing unit, determining whether a first data block within a first data storage unit associated with the first processing unit is no longer needed during execution of the first task, and evicting the first data block from the first data storage unit in response to determining that the first data block is no longer needed during the execution of the first task. In some embodiments, determining whether the first data block within the first data storage unit associated with the first processing unit is no longer needed during execution of the first task may be based on compiler information, an application programming interface (API) call within code of the first task, or both.

In some embodiments, evicting the first data block from the first data storage unit in response to determining that the first data block is no longer needed during the execution of the first task may include setting the first data block as a next victim data block in a replacement chain of a cache replacement policy associated with the first processing unit, detecting a data block miss corresponding to a second data block, and evicting the first data block from the first data storage unit in response to detecting the data block miss and based on the cache replacement policy. In some embodiments, the method may further include operations for determining whether the first data block is needed for performing a second task in the scheduling priority order, wherein the second task is performed by a second processing unit associated with a second data storage unit, and transferring the first data block to the second data storage unit in response to determining that the first data block is needed for performing the second task and upon eviction from the first data storage unit.

In some embodiments, evicting the first data block from the first data storage unit in response to determining that the first data block is no longer needed during the execution of the first task may include setting the first data block as a next victim data block in the first data storage unit, identifying that new driver-managed data is needed within the first data storage unit for use with the first task, determining whether there is insufficient storage space in the first data storage unit for the identified new driver-managed data, and evicting the first data block from the first data storage unit in response to determining that there is insufficient storage space for the new driver-managed data in the first data storage unit. In some embodiments, the first data storage unit may be a driver-managed data structure associated with the first processing unit, a custom software-managed data store, or a custom hardware managed data store.

In some embodiments, configuring the plurality of tasks to be performed on the plurality of processing units based at least on the calculated data transfer costs may include determining whether there is a better processing unit for executing a first task based on the calculated data transfer costs, wherein the first task may be already configured to execute on a first processing unit, and re-assigning the first task to be executed by a second processing unit in response to determining that there is a better processing unit. In some embodiments, configuring the plurality of tasks to be performed on the plurality of processing units may include configuring dynamic voltage and frequency scaling (DVFS) settings for processing units executing each of the plurality of tasks based on the calculated data transfer costs. In some embodiments, the DVFS settings control a use of a processing unit, a use of a bus, or a combination of both.

Further embodiments include a computing device configured with processor-executable instructions for performing operations of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with various memory and/or data storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

Figure 1:
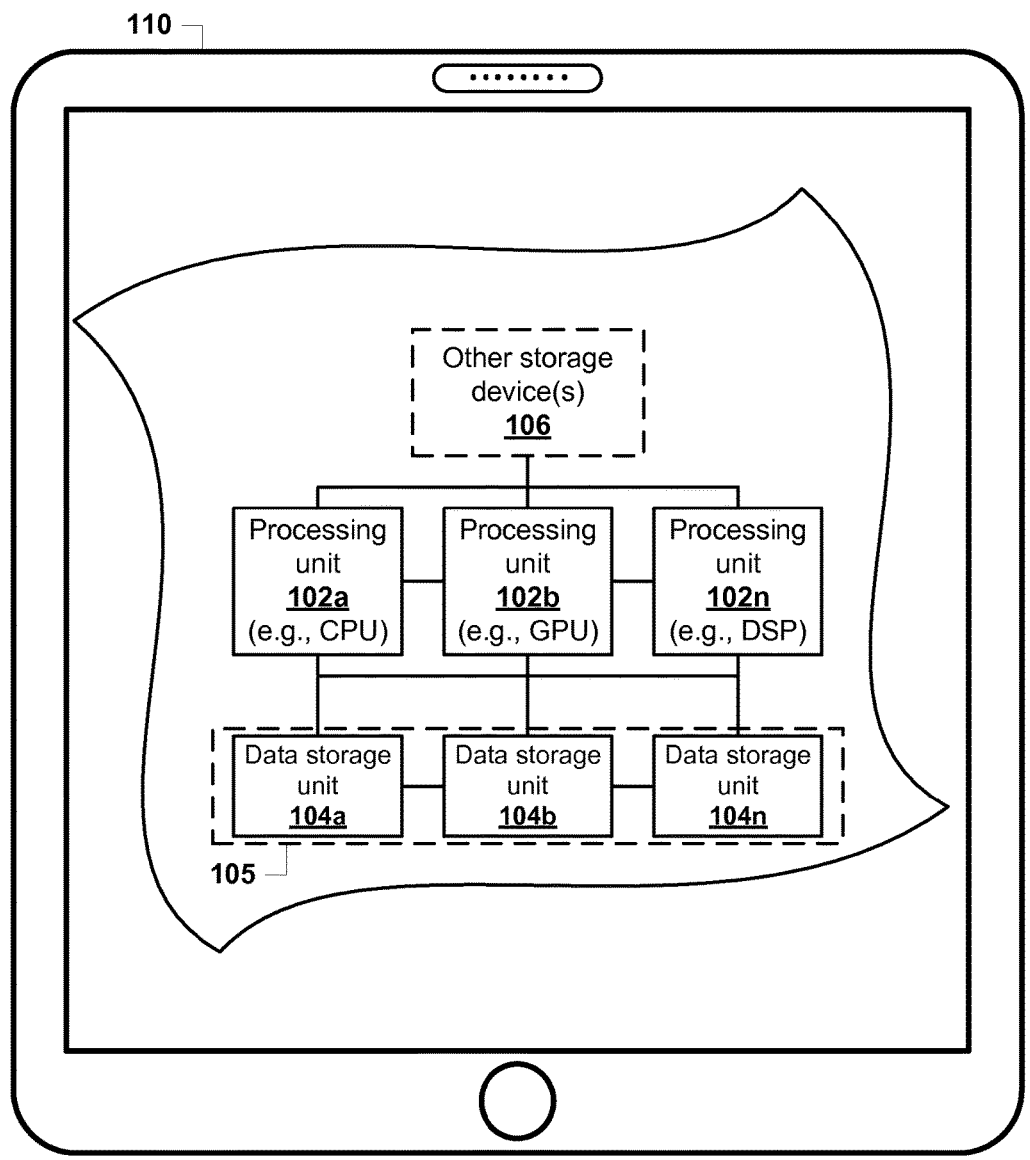
FIG. 1 is a component block diagram illustrating a plurality of processing units and data storage units in an exemplary computing device that is suitable for use in various embodiments.

The terms "multi-core computing device", "heterogeneous computing device", and "multi-processor computing device" are used interchangeably herein to refer to a computing device configured to execute various tasks (e.g., routines, instruction sets, etc.) with two or more processing units or devices, such as application processors (e.g., a CPU) or specialized processing devices (e.g., a GPU, a DSP, etc.). For example, a heterogeneous computing device may be a multi-processor computing device (e.g., a system-on-chip (SoC)) with different processing units configured to perform various operations, such as executing routines, tasks, etc. Such multi-processor computing devices may be configured with various data storage (e.g., cache(s), memory(s), storage medium unit(s) connected via wired/wireless connection(s), etc.). An exemplary multi-processor computing device is illustrated in FIG. 1.

The terms "data storage unit(s)" and "data store(s)" are used herein to refer to various devices, portions/locations of memory, caches, and/or other components of a computing device configured to store data for use by one or more processing units of a multi-processor computing device. For example, data storage units may include distinct volatile or non-volatile storage components that are statically or dynamically associated with a processing unit (e.g., a core, a CPU, etc.). As another example, a data storage unit may correspond to a range of memory addresses that are associated with a particular core of a SoC or alternatively a storage area within system memory. In some embodiments, data storage units may include shared memory accessible by various processing units.

The terms "buffer(s)" and "buffer data" are used herein to refer to abstract program representations of contiguous program data. Buffer data is stored within a data storage unit. Buffer data may be transferred between data storage units so that different processing units accessing the data storage units may utilize the buffer data. Such buffer data transfers may include transfers of entire buffers or portions of buffers. The terms "buffer" and "buffer data" are used herein for illustrative purposes and are not intended to limit the embodiments or claims to any particular type of data that may be stored within various data storage units of a multi-processor computing device.

To maintain high performance and satisfactory user experience, multi-processor computing systems require fast and low power (energy) data transfers between data storage used by the various processing units. For example, routines executing on a multi-processor mobile device may require quick data exchanges between any combination of the processing units participating in the execution of the routines.

Various embodiments provide methods, devices, systems, and non-transitory process-readable storage media for improving data management and buffer utilization in multi-processor computing devices by using programmer and/or runtime data. In particular, a multi-processor computing device may be configured to utilize available information of tasks and the system's capabilities in order to estimate the likely costs for transferring data between data storage units accessed by processing units.

For example, based on scheduler data indicating the dependencies of various tasks to certain buffer data, the multi-processor computing device may calculate an estimated time cost and/or estimated power (energy) consumption cost for transferring data of a buffer to the cache of a GPU. As another example, via an application programming interface (API) call, the multi-processor computing device may receive user-provided data indicating the data size and/or criticality (or urgency) of tasks to be performed on a first processing unit (e.g., CPU) and determine the data transfer cost for the data of the particular size to be moved from a dedicated memory unit to a processor cache unit. As another example, when the user indicates that a task may only be executed by certain processing units, the multi-processor computing device may calculate required data transfer costs to retrieve the data for use with those processing units.

With such data transfer costs, the multi-processor computing device may also perform various organizational (or prioritization) operations to improve the efficiency of the execution of the tasks, such as by sorting (or ordering) the tasks and strategically flushing data. For example, based on data transfer costs of a first task and a second task to be performed on a first processing unit, the multi-processor computing device may schedule the first task to execute first due to having a lower estimated time and/or power (energy) consumption for associated data transfers. In general, the multi-processor computing device may utilize various scheduling schemes in order to prioritize task executions based on data transfer costs. For example, a scheduler used by the multi-processor computing device may use a sorted queue, distributed queues, scheduling graphs, and/or any other scheduling abstraction configured to organize, sort, and/or otherwise prioritize tasks. As another example, the multi-processor computing device may prioritize by creating multiple independent queues with potential synchronization between the queues (i.e., distributed scheduling). Prioritization based on estimations of data transfer costs required for performing tasks may enable the multi-processor computing device to improve efficiency of task executions with regard to data transfers and thus reduce unnecessary flushing and other drawbacks that may be present in systems lacking coherency.

In various embodiments, the multi-processor computing device may generate heuristic models (referred to herein as "data transfer heuristic models") that may be used to calculate costs of transferring data between various data storage units of the system and processing units. Such a heuristic approach may utilize measurements made over time of power (energy) consumption and/or time for sample transfers between various data storage units of the system to create data that may be used (or queried) in real time to estimate costs for data transfers needed to perform tasks on various processing units. For example, using a known buffer size (e.g., provided by programmer via an API call) and embedded power measurement capabilities, the multi-processor computing device may compute a simple model of a transfer by (1) measuring delay and consumed power resulting from transferring data of various sizes (e.g., a minimum size, L1, L2, and L3 cache blocks and page sizes, etc.) between all possible combinations of storage (e.g., core caches, GPU memory, system memory, etc.), and then (2) adjusting coefficients used in heuristic models. In some embodiments, the data transfer heuristic models may utilize formulas that may be updated over time.

For example, an embodiment linear formula used to estimate latency for transferring a certain data block size in between data storage units (e.g., cost for transferring cache line(s) between caches of processing units, etc.) may be represented as:

$$\text{latency}(size) = \text{latency\_0} + \text{latency\_coef} * size,$$

wherein "size" may represent a data size for transfer, "latency_0" may represent an overhead cost and "latency_coef" may represent a coefficient generated based on sample transfers. As another example, an embodiment formula used to estimate power (energy) consumption for transferring a certain data block size in between two data storage units (or processing unit caches) may be represented as:

$$\text{power}(size) = \text{power\_0} + \text{power\_coef\_2} * size^2 + \text{power\_coef\_1} * size),$$

wherein "size" may represent a data size for transfer, "power_0" may represent an overhead cost and "power_coef_1" and "power_coef_2" may represent a coefficient generated based on sample transfers. In some embodiments, there may be multiple implementations of such formulae in linear and quadratic form, where each formula may apply only to specific ranges of buffer sizes and to a specific pair of source and destination data storage units. Further, there may be a lookup table of coefficients enabling the multi-processor computing device to perform a table lookup based on the range of data transfer sizes involved and the data storage units involved (e.g., source, destination).

In some embodiments, data transfer heuristic models may be computed offline with an external power meter, which may useful for multi-processor computing devices (e.g., the processing unit(s) therein) that do not have embedded power measurements. In some embodiments, such data transfer heuristic models may be calculated when the multi-processor computing device is started/booted-up, during application execution (or runtime), and/or on a periodic basis (e.g., every other week, etc.). In some embodiments, more complex data transfer heuristic models may be generated that take into the account the temperature and packaging of the multi-processor computing device. In some embodiments, the multi-processor computing device may obtain measurements (e.g., temperatures, etc.) using embedded power monitoring capabilities in order to provide some data used for generating data transfer heuristic models.

In some embodiments, data transfer heuristic model data may be exposed to a user-space for use by a runtime functionality and/or made available by an operating system (OS) via an application programming interface (API), such as via API calls that take the size of a data set to be sent, a source identity of a source data storage unit, and a destination identity of a destination data storage unit as inputs and that return a value representing the cost of the transfer. For example, user-generated code for a particular task may include an API call for estimating a data transfer cost of moving a data set of a certain size from the cache of a first processing unit (e.g., a CPU) to the cache of a second processing unit (e.g., a GPU), a system memory, and/or other data storage unit.

The multi-processor computing device may configure how and when various tasks are to be performed using the calculated data transfer costs in combination with information from programmers and/or a scheduler indicating the state of data storage units and/or future operations. In particular, the multi-processor computing device may configure the order of execution or priority for each task to improve efficiency with regard to costly flushes that may be required when transferring data. For example, based on calculated data transfer costs of buffer data between data storage units, the multi-processor computing device may determine a prioritized order for performing all tasks on one or more cores such that data transfer costs and flushing operations may be minimized or at least reduced compared to costs incurred with a default scheduling order that does not incorporate data transfer costs.

In some embodiments, based on data transfer cost estimates, the multi-processor computing device may configure (or assign) tasks to execute on particular processing unit such that associated data transfer costs are reduced or minimized. For example, when the code for a task is available for multiple cores, the costs of buffer data transference between data storage units accessible to the cores may be used to select a certain core for executing the task such that the transfer of buffer data to an associated data storage unit would incur the least time and/or power (energy) consumption cost. In some embodiments, when a task graph is known at compile time, a core may be selected at compile time.

Typically, when experiencing a cache miss while executing a first task, a cache may evict blocks associated with another task to make new insertions for the first task. Such actions can be costly, and may impair the runtime of the second task. To improve this scenario, in some embodiments the multi-processor computing device may update a cache replacement policy when detecting a last use of a data segment within a data storage unit (e.g., a cache of a core, etc.) corresponding to a current task. For example, with compiler support or at the end of task execution, the multi-processor computing device may proactively change the position of a data block in the replacement chain to ensure an early eviction of buffer data (preventive action), as that data block may no longer be needed for subsequent tasks or processing units accessing that data. In other words, compiler analysis may be used to determine use-lifetimes for data blocks used by tasks. This may allow data segments to be flushed early, and thus may reduce waiting times while flushing is completed due to data transfers between data storage units. In some embodiments, such proactive flushing operations may require per-address cache block flushing capabilities, which may be provided by specialized hardware. In some embodiments, programmers may provide information, such as via API call within task code, that indicates at runtime whether a task will be the last to use a data segment stored in a data storage unit, allowing early eviction if so. For example, a programmer may insert API calls into a task's code to indicate when certain ranges of data (or data blocks) are no longer needed by the task (e.g., a call such as 'data_block_finished(start, size)', etc.), thus allowing the multi-processor computing device to conduct early eviction of the ranges of data. Such API calls may be provided by a runtime system, such as Multicore Asynchronous Runtime Environment (MARE).

In some embodiments, when the multi-processor computing device has detected the last access of a particular data segment of a data storage unit (e.g., a data block) by a processing unit executing a task, the multi-processor computing device may evict the data segment and transfer the data segment to another data storage unit for use with another task/processing unit. In such an "evict and push" manner, the data segment may be allocated at the beginning of the execution of the other task (or "pre-fetched" for the subsequent task/processing unit). Based on the type of data storage unit usage (e.g., read-only) and the capabilities of the processing units, the multi-processor computing device may also multicast block data to multiple processing units and/or associated data storage (e.g., caches).

In some embodiments, a multi-processor computing device may use scheduler/programmer information to configure tasks for execution by dynamically adjusting voltage/frequency scaling (e.g., via dynamic voltage and frequency scaling (DVFS) settings), such as to accommodate the urgency/criticality of different tasks. For example, with an urgency/criticality of a task that is based on the number of successor tasks, extra information from the programmer, and/or a calculated data transfer cost, the multi-processor computing device may configure a task with no data dependencies to successor tasks to use a lower frequency to save power, while configuring another task with multiple successors to use a higher frequency. Such configurations may address both core DVFS settings (e.g., adjustments to processing unit frequency used to execute tasks) and bus DVFS settings (e.g., adjustments to the speed of enacting a data transfer). For example, bus DVFS settings may be adjusted by the multi-processor computing device based on task scheduler data indicating whether there will be a delay before a task can start execution due to data transfers and/or dependencies. Various conditions may be evaluated for adjusting DVFS settings, such as whether a task is be waiting for a suitable core to execute and/or whether a task is waiting for task dependences to be satisfied.

The embodiment techniques may be beneficially used with both cache-based memory data stores (e.g., cache blocks, etc.) and driver-managed data stores (e.g., OpenCL, OpenGL buffers, etc.). For example, computing device implementing embodiment methods of the various embodiments may be configured to apply embodiment eviction, pre-fetch, and/or task-scheduling-order operations to supported OpenGL buffers. Non-limiting examples of such driver-managed data stores may include various custom software (SW)-managed data stores and custom hardware (HW)-managed data stores (e.g., OpenCL, OpenGL, ION memory, etc.). Such driver-managed data stores may be accessed by specialized devices, such as GPUs, DSPs and/or custom accelerators that may not utilize caches. Similar to the use of replacement-chains with cache-based memory stores, driver-managed data stores may use driver calls and custom software or hardware data store managers when implementing some embodiment techniques.

The embodiment techniques provide detailed calculations for identifying data transfer costs within multi-processor computing systems, such as heterogeneous multi-core systems. For example, embodiment calculations for estimating latency/power (energy) consumption for transferring data from a first data storage unit to a second data storage unit may utilize particular coefficient values of a data transfer heuristic model that may be accessed via software, routines, etc. In other words, instead of calculating overall compute time for all computations of tasks, the embodiment calculations may estimate the data transfer-specific costs (e.g., time and/or power (energy) consumption) required by processing units when executing the tasks. For example, the embodiment techniques may not provide an overall calculation of the various costs required to execute a task (e.g., cycles, execution time, etc.), but instead may only provide accurate projections for the costs for transferring data between one or more data storage units of the system in order to execute the task.

The embodiment techniques enable software (e.g., runtime functionalities, client applications, schedulers, etc.) access to data transfer cost estimates that may be used to improve the efficiency of task performance. For example, the embodiment techniques may expose information to the operating system (OS) or applications, allowing code utilizing API calls to determine the data transfer costs that may likely be required for executing a particular task on any of the available processing units of a multi-processor computing device. Further, unlike some conventional techniques that may utilize a compiler and/or a kernel profiler to match workloads to processors, the embodiment techniques may utilize data-based, heuristic model(s) that provide time and/or power (energy) consumption estimates for data transfers based on limited inputs. For example, the time required for moving data needed by a task may be determined with an API query that includes only a size of data to transfer, a source identity of a source data storage unit, and a destination identity of a destination data storage unit.

In some embodiments, the multi-processor computing device may execute a dedicated runtime functionality (e.g., a runtime service, routine, or other software element, etc.) to perform various operations for generating data transfer cost information or estimates as described herein. For example, the runtime functionality may be configured to take into consideration the topology of the computing device and/or cache properties (e.g., size, associativity, atomic granularity, etc.). In some embodiments, the runtime functionality may be an implementation of Qualcomm's Multicore Asynchronous Runtime Environment (MARE). For example, the runtime functionality may be a MARE functionality that is further configured to identify the power (energy) consumption and/or time likely required to transfer data between data storage units utilized by heterogeneous cores of an SoC.

The embodiment techniques may be implemented in any computing device having more than one processing unit. For example, embodiment methods may be performed by a laptop computer having a CPU and a GPU, a smartphone-type mobile device having multiple cores and/or processors, and/or a uniprocessor with a cache hierarchy. For simplicity, the descriptions herein may refer to multi-processor mobile device(s); however, the embodiments and claims are not intended to be limited to any particular type of computing device with a plurality of processing units.

FIG. 1 illustrates a plurality of processing units 102a-102n (e.g., CPU, GPU, DSP, etc.) and data storage units 104a-104n in an exemplary heterogeneous computing device (e.g., a multi-processor mobile device 110) suitable for use with the various embodiments. The mobile device 110 may be configured to execute various applications, threads, software, routines, instruction sets, tasks, and/or other operations via one or more of the processing units 102a-102n. For example, concurrent with the execution of various operations associated with an operating system, the mobile device 110 may be configured to execute an embodiment runtime functionality via an application processor or CPU (e.g., processing unit 102a). Buffer data used by or otherwise associated with the operations performed on the various processing units 102a-102n may be stored within and retrieved from the various data storage units 104a-104n managed in the mobile device 110. For example, instructions, variable data (e.g., measurements data, user input data, etc.), and other information used by routines or applications may be stored as buffers (or buffer data) stored within the data storage units 104a-104n for use by tasks executing on the processing units 102a-102n.

In some embodiments, the data storage units 104a-104n may be discrete memory devices or different memory spaces. In some embodiments, the data storage units 104a-104n may be contiguous or non-contiguous sections in a shared memory space of a memory unit 105, such as ranges of addresses or blocks within a unified memory device (e.g., a cache, RAM, etc.). In some embodiments, each of the data storage units 104a-104n may be directly associated with one of the processing units 102a-102n. For example, the first data storage unit 104a may be associated with the first processing unit 102a (e.g., CPU), the second data storage unit 104b may be associated with the second processing unit 102a (e.g., GPU), and the third data storage unit 104n may be associated with the third processing unit 102n (e.g., DSP).

In some embodiments, the processing units 102a-102n may access and otherwise utilize other data storage device(s) 106 for storing data used in association with executing various tasks. For example, the processing units 102a-102n may retrieve data from a main or system memory device (e.g., RAM), a cache unit(s), and/or an external data storage device (e.g., a memory device connected to the mobile device 110 via a universal serial bus (USB) connection and/or a wireless connection (e.g., Bluetooth®, Wi-Fi®), etc.).

Figure 2A:
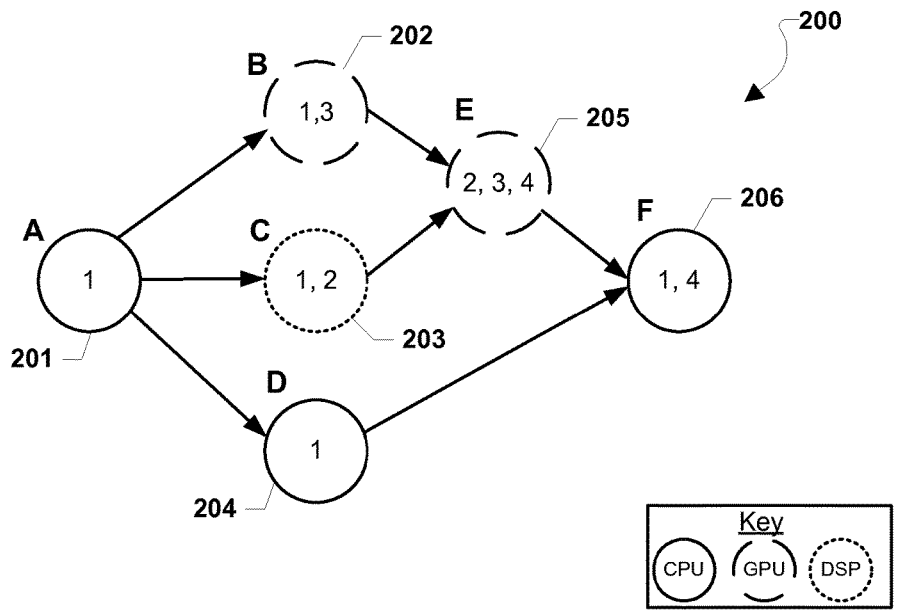
FIG. 2A is a diagram illustrating dependencies of tasks configured to utilize data within various data storage units while being executed by various processing units of an exemplary computing device that is suitable for use in various embodiments.

FIG. 2A is a conceptual diagram 200 illustrating dependencies of exemplary tasks 201-206 (i.e., tasks A-F) that are configured to be executed on various processing units (e.g., CPU, GPU, DSP) of a multi-processor computing device (e.g., mobile device 110 of FIG. 1). In general, tasks executed by the various processing units of a multi-processor computing device may utilize buffer data stored within various data storage units (e.g., buffer data within memory units, etc.). In order for the respective processing units (and thus the tasks) to access required data, the data may need to be transferred in between data storage units, requiring time and/or power (energy) consumption. In order to efficiently estimate data transfer costs for transferring data needed for performing the tasks, some embodiment techniques may identify data dependencies of tasks with regard to processing units and/or the locations of data. For example, a scheduler or runtime functionality may identify that a first and second task may both require data of a first buffer stored within a first data storage unit. In some embodiments, data transfer costs (e.g., times, etc.) may indicate costs associated with maintaining cache coherency when multiple tasks are performed in sequence. For example, the cost to transfer data for use by a second task may include not only a data transfer time, but also a time estimate based on the time to complete the use of the data by a first task. Performing such a time estimation may cause the multi-processor computing device to go through several branches of the task tree, including both communication and computing times.

Each of the different exemplary tasks 201-206 of the diagram 200 are illustrated as configured to utilize data of one or more buffers (i.e., buffers 1-4) stored within various data storage units. For example, a first task 201 ("A") may utilize data of buffer "1", a second task 202 ("B") may utilize data of buffers "1" and "3", a third task 203 ("C") may utilize data of buffers "1" and "2", a fourth task 204 ("D") may utilize data of buffer "1", a fifth task 205 ("E") may utilize data of buffers "2", "3", and "4", and a sixth task 206 ("F") may utilize data of buffers "1" and "4". Based on information indicating data transfer costs with regard to time and/or power (energy) consumption, as well as the overlapping use of buffer data stored within various data storage units, the multi-processor computing device (e.g., via a runtime functionality) may determine estimated data transfer costs for the various tasks and may further perform scheduling or other operations to improve the performance of the tasks.

For example, the multi-processor computing device may determine that buffer "1" is read-only with regard to tasks 202-204 based on runtime data (i.e., tasks 202-204 may not modify data of buffer "1"). Based on this, after the CPU executes the first task 201 that uses data of buffer "1", tasks 202-204 may be launched at the same time on the GPU, DSP, and CPU respectively. As another example, without knowing that buffer "1" is read-only with regard to tasks 202-204, a driver may be configured to flush buffer "1" from use by the CPU in order to enable the second task 202 on the GPU and/or the third task 203 on the DSP to potentially modify the data of the buffer "1". As another example, the CPU may be configured to maintain the buffer "1" (e.g., keep in cache of the CPU) due to the multi-processor computing device determining that the sixth task 206 run on the CPU may require the data of the buffer "1".

Figure 2B:
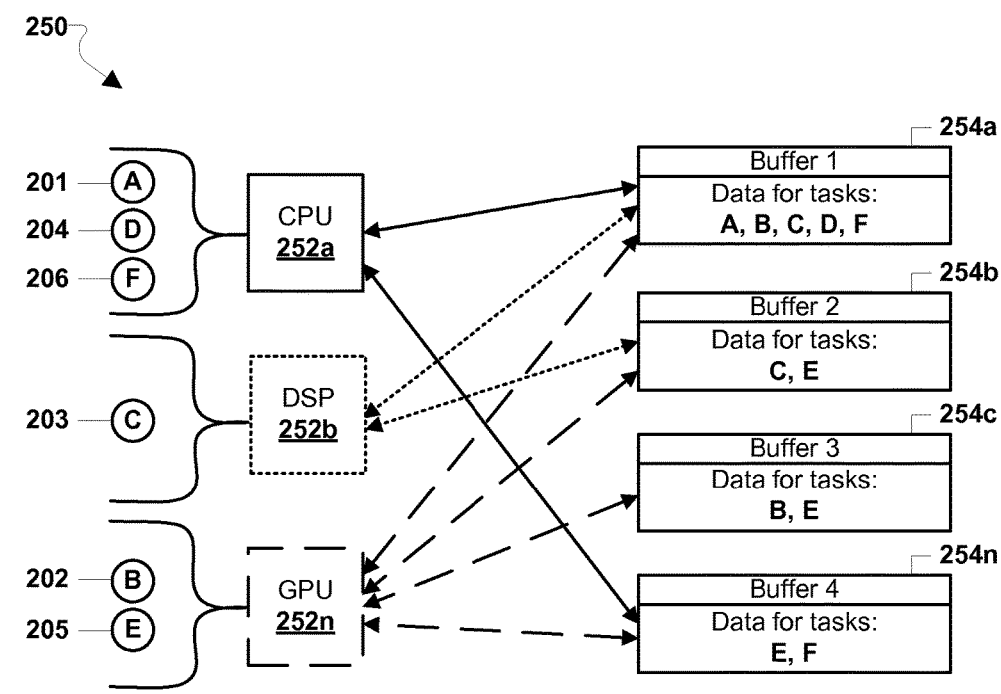
FIG. 2B is a component block diagram illustrating data storage accesses required to execute a plurality of tasks by a plurality of processing units of an exemplary computing device that is suitable for use in various embodiments.

FIG. 2B is a component diagram 250 illustrating exemplary accesses of buffer data (i.e., buffers 254a, 254b, 254c-254n) by a plurality of processing units 252a-252n in order to execute the plurality of exemplary tasks 201-206 as described with reference to FIG. 2A. In particular, FIG. 2B illustrates that a first task 201, fourth task 204, and sixth task 206 may be assigned to execute on a CPU 252a, requiring data of a first buffer 254a and a fourth buffer 254n; a third task 203 may be assigned to execute on a DSP 252b, requiring data of the first buffer 254a and a second buffer 254b; and a second task 202 and a fifth task 205 may be assigned to execute on a GPU 252n, requiring data of the all of the buffers 254a-254n. In various embodiments, the buffers 254a-254n may be stored within various types of data storage units, such as caches directly associated with any of the processing units 252a-252n, portions of shared memory, and/or other data storage devices coupled to the multi-processor computing device.

Embodiment techniques for generating data transfer heuristic models for determining data transfer costs between data storage units may be used in a number of applications to improve the overall functioning of a multi-processor computing device. For example, in a 4-core system, the multi-processor computing device (e.g., via a runtime functionality) may use a data transfer heuristic model to estimate the cost of moving buffer data from data storage units for use by a first core and a second core in order to identify the core on which a certain task might best be executed at a given time. FIGS. 3-7 provide examples of various implementations that generate and utilize embodiment data transfer heuristic models.

Figure 3:
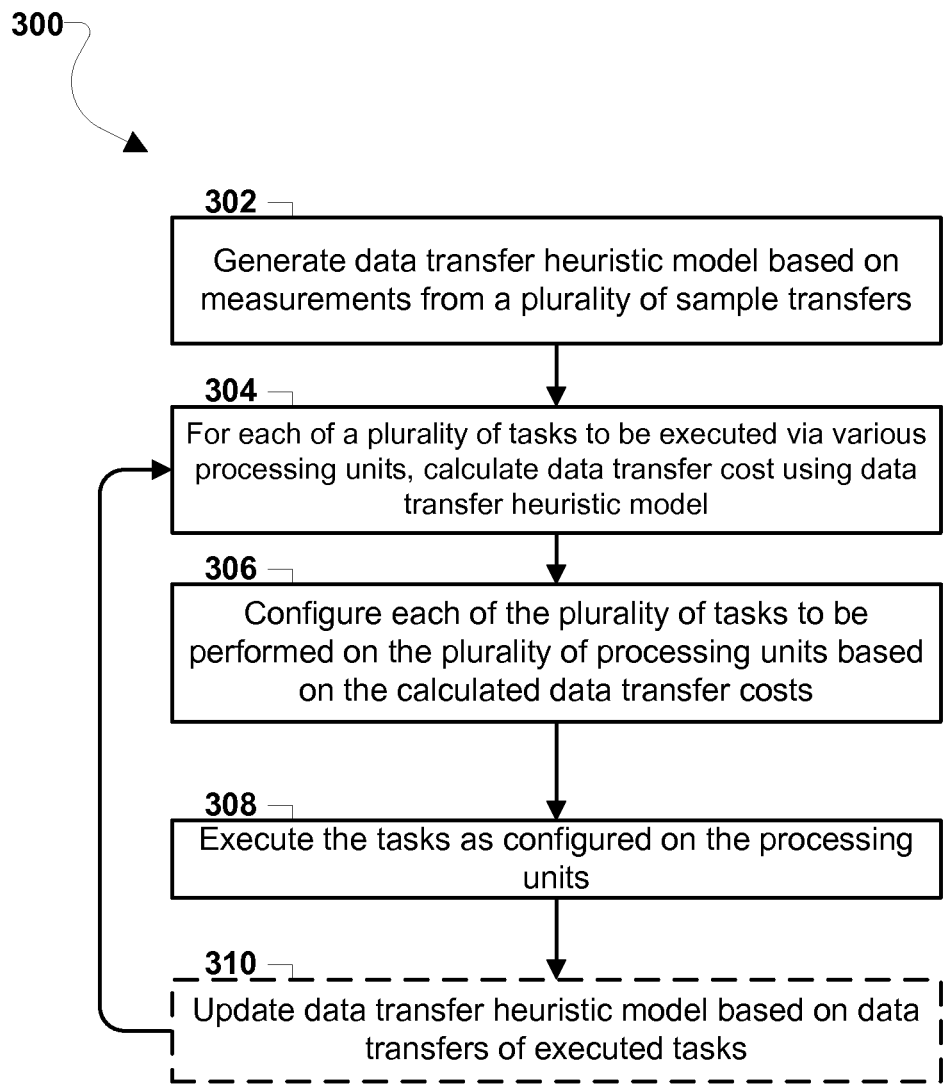
FIG. 3 is a process flow diagram illustrating an embodiment method performed by a computing device to calculate data transfer costs associated with a plurality of tasks to be executed on a plurality of processing units.

FIG. 3 illustrates an embodiment method 300 performed by a multi-processor computing device to calculate data transfer costs associated with a plurality of tasks to be executed on a plurality of processing units. For each of the tasks available to be executed at a given time, the multi-processor computing device may identify data transfer costs using a pre-generated heuristic model. Further, based on the identified data transfer costs within the computing system (e.g., between caches, memories, SW/HW-managed data stores, etc.), the multi-processor computing device may perform various optimization operations (e.g., configurations of the tasks) to improve the execution efficiency of the tasks, such as prioritizing the tasks for execution in a certain sequence or execution queue and/or execution on certain processing units. Various operations of the method 300 may be performed by a runtime functionality executing via a processor or processing unit of a multi-processor computing device, such as the CPU 102a of the mobile device 110 described with reference to FIG. 1.

In block 302, the multi-processor computing device may generate a data transfer heuristic model based on measurements from a plurality of sample transfers between a plurality of data storage units. The multi-processor computing device may generate a data transfer heuristic model that may be used to predict or otherwise gauge the time and/or power (energy) consumption costs for transferring certain sizes of data between certain data storage units of the computing device. Such measurements may include time measurements and/or power (energy) consumption measurements and may be taken by the multi-processor computing device during a training period in which the multi-processor computing device obtains empirical data indicating latency and/or bandwidth, for various memories of the multi-processor computing device. In some embodiments, the measurements may further include overhead information accessible to the OS of the multi-processor computing device (e.g., overhead costs for buffer/kernel modules, etc.). In addition to the sample transfers, in some embodiments the data transfer cost model may also be based on measurements taken during real transfers associated with program execution(s).

The data transfer heuristic model generated in block 302 may be based on sample transfers involving various types of data storage units, such as cache memory locations, system memory, and any other data storage devices associated with the processing units of the computing device. For example, the multi-processor computing device may perform a sample data transfer that simulates a data transfer from system memory to a GPU memory. In some embodiments, if the multi-processor computing device does not have embedded power measurements, the computing device may generate the model offline with an external power meter.

In some embodiments, the data transfer heuristic model may be generated in block 302 when the computing device starts up (or at a boot-up time), restarts or reboots the operating system, and/or a periodic basis (e.g., at repeatedly at the expiration of a predefined time interval, such as every other week, etc.). In various embodiments, the data transfer heuristic model may be generated by the operating system (OS) of the multi-processor computing device, the runtime functionality, and/or other functionalities of the multi-processor computing device (e.g., an extensible firmware interface (EFI) between an operating system and firmware, etc.).

In various embodiments, the data transfer heuristic model may include formula, equations, and/or other calculation frameworks that utilize coefficients that are set based on measurements of the sample transfers. For example, subsequent to the generation of the data transfer heuristic model, the multi-processor computing device may estimate data transfer costs of a certain data transfer (e.g., a certain data size from a certain source data storage unit to a certain destination data storage unit, etc.) based on calculations that use the set coefficients. In some embodiments, the coefficients may be estimated and set in response to and based on transferring a minimum size between all possible combinations of processing units of the computing device, transferring data of several sizes (e.g., L1, L2, and L3 cache blocks and page sizes, etc.), and storing measurements of the time and consumed power needed for the sample transfers. In some embodiments, the multi-processor computing device may set and/or update such coefficients each time the data transfer heuristic model is generated (e.g., at start-up, periodically, etc.). In some embodiments, the multi-processor computing device may utilize available embedded power measurement capabilities of the computing device to compute a simple model of a data transfer.

In some embodiments, the data transfer heuristic model may utilize a linear heuristic related to the time cost (or latency) of data transfers represented by the following formula:

$$\text{latency(size)}=\text{latency(sender)}+\text{latency(receiver)}+(X^*\text{size}),$$

wherein "size" represents the size of the data to be transferred, "sender" represents the processing unit (or an associated data storage unit) currently using or storing the data to be transferred, "receiver" represents the destination processing unit (or an associated data storage unit) that may receive the data to be transferred, and 'X' represents a coefficient. The latency of the sender and the receiver may include the associated cost of reading (and flushing when required) data/instructions from the memory hierarchy in order to send/receive the data/instructions with the communication network. Such reading (and flushing when required) costs may or may not be fixed and determined by the micro architecture of the sender-receiver.

In some embodiments, the data transfer heuristic model may utilize a quadratic heuristic related to the power (energy) consumption cost of data transfers represented by the following formula:

$$\text{power(size)}=\text{power(sender)}+\text{power(receiver)}+(X^*\text{size}^2)+(Y^*\text{size}),$$

wherein "size" represents the size of the data to be transferred, "sender" represents the processing unit (or an associated data storage unit) currently using or storing the data to be transferred, "receiver" represents the destination processing unit (or an associated data storage unit) that may receive the data to be transferred, 'X' represents a first coefficient, and 'Y' represents a second coefficient. The quadratic formula for power may utilize a degree-2 polynomial because power is proportional to the square of the capacity that is proportional to the data storage unit size. In some embodiments, the coefficients (e.g., X or Y) may be computed per pairs when the sender and receiver units are not similar in architecture (e.g., X(sender, receiver)). For example, if in a system with several equal cores, the cost of sending and receiving may be the same.

In some embodiments, the data transfer heuristic model may be generated and/or updated using other formulas and techniques, such as by accounting for effects to data transfers in the multi-processor computing device based at least on various temperature within the multi-processor computing device, packaging/housing/structure of the multi-processor computing device, transient failure rate, etc. For example, when the temperature of a receiver node is very high, its power can be multiplied by a factor proportional to the current temperature divided by the desired temperature of operation. In some embodiments, the multi-processor computing device may utilize embedded power monitoring capabilities in order to measure data used for generating the data transfer heuristic model, such as device temperature data.

In some embodiments, the operating system (OS) of the multi-processor computing device may expose the coefficients to a user-space of the multi-processor computing device so that various software, routines, etc. (e.g., the runtime functionality) may be able to directly access the data transfer heuristic model and current values for the coefficients. In some embodiments, the OS may expose a table with the measured values from the different tested data transfer sizes such that the runtime functionality may interpolate values within the table.

In some embodiments, when the coefficients are maintained by the OS but not exposed to a user-space, the runtime functionality may be able to utilize various API calls to receive data indicating costs of data transfers based on the data transfer heuristic model (e.g., use an API call that takes the size of a buffer as input and returns a value representing the cost of a data transfer, etc.). Exemplary API calls may include get_latency_estimation(size, sender, receiver) and get_power_estimation(size, sender, receiver), wherein the "size" parameter may represent a data size to be transferred, "sender" represents the processing unit (or associated data storage unit) currently using or storing the data to be transferred, and "receiver" represents the destination processing unit (or associated data storage unit) that may receive the data to be transferred.

In some embodiments, the data transfer heuristic model may be generated such that particular data storage units, processing units, data sizes, and/or other transfer conditions may be preferred. In other words, certain data transfers may have data transfer costs estimated by the data transfer heuristic model that are more beneficial (e.g., lower in cost) than other data transfers. For example, internally, the data transfer heuristic model via the OS may not provide the actual cost of a particular data transfer from a first data storage unit to a second data storage unit, but instead may perform some adjustment to resulting cost estimates in order to provide estimates that favor (or show a smaller cost) of the data transfer from the first data storage unit to the second data storage unit over other possible transfers (e.g., from the first data storage unit to a third data storage unit, etc.). As another example, the data transfer heuristic model may be configured to always provide lower data transfer cost estimates for data transfers that involve a certain processing unit (e.g., GPU, etc.). Such adjustments to the data transfer heuristic model estimates may be based on scheduler information, multi-processor computing device operating conditions, user preferences, and/or other conditions that may or may not be temporary. For example, when the OS has data indicating that the GPU is scheduled to perform a costly frame render in the near future, estimated data transfer costs that involve the GPU (e.g., as a transfer destination) prior to the frame render may be higher than normal.

At some time after generation of the data transfer heuristic model, the multi-processor computing device may begin estimating data transfer costs at runtime for a plurality of tasks. Thus, in block 304, the multi-processor computing device may calculate a data transfer cost for each of a plurality of tasks to be executed on certain processing units using the data transfer heuristic model. Such estimated costs may not directly reflect the processing abilities (e.g., clock speeds, etc.) of the processing units executing the various tasks, but instead may indicate the data transfer-related costs, such as measurements related to time delay, power consumed, etc. For example, the multi-processor computing device may estimate or otherwise calculate transfer times and power (energy) consumption for each of the tasks based on querying the data transfer heuristic model using an application programming interface (API) call that indicates a source identity (i.e., a source data storage unit for particular data required by the tasks), a destination identity (i.e., a destination data storage unit that may receive the particular data), and the size of the particular data to be transferred (or a data transfer size). In some embodiments, such API calls may be invoked from the tasks' codes. In some embodiments, the multi-processor computing device may also evaluate task dependencies to compute the data transfer costs of the tasks. For example, calculating data transfer costs may include identifying data dependencies between the plurality of tasks, wherein such data dependencies may be provided via a scheduler.

In block 306, the multi-processor computing device may configure each of the plurality of tasks to be performed on the plurality of processing units based on the calculated data transfer costs. In various embodiments, the multi-processor computing device via a scheduler may utilize any number of implementations to prioritize the plurality of tasks based on the calculated data transfer costs, such as sorting tasks in a single queue, creating multiple independent queues that may be synchronized (i.e., distributed scheduling), creating a scheduling graph, etc. For example, such configurations may include assigning specific tasks to particular processing units for execution, adjusting DVFS settings, and/or sorting or ordering tasks into a sorted queue. In block 308, the multi-processor computing device may execute the plurality of tasks as each was configured in block 306 on various processing units.

In optional block 310, the multi-processor computing device may update the data transfer heuristic model based on the data transfers of executed tasks. For example, the data transfer heuristic model may be updated when the effective cost of transferring data between data storage units is reduced based on optimizations and/or prioritizations using the data transfer calculations with the model (e.g., sorting, re-assignments to different processing units, evicting and/or pre-fetching, etc.). Such updates may require adjustments to coefficients as described herein.

In some embodiments, the multi-processor computing device may adjust the data transfer heuristic model to utilize the following adjusted latency equation:

$$\text{latency}(\text{size}) = \text{latency}(\text{sender}) + \text{latency}(\text{receiver}) + (X^*\text{size}) - \text{savings}(\text{size}),$$

wherein "latency" "size", "sender", "receiver", and "X" are described herein, and "savings(size)" represents a measured time savings.

In some embodiments, latency may include the cost of evicting the data from a data storage unit, such as the cost of evicting from cache/memory when data has been modified and the cache line contains the single valid copy for the data in the system. Such an eviction cost may be proportional to the size of the data and may be computed as part of the ($X^*$size) term. In such a case, the term savings(size) may subtract the cost of the eviction that is included by default. For example, during the computation of heuristics, the eviction cost may be computed and stored for later application via the above-indicated formula. In some embodiments, such savings may be different based on the position of the block within a least recently used (LRU) ordered list of cache blocks (e.g., list based on when cache blocks were last used). As an eviction may not be guaranteed, the heuristic may also take into account the LRU position as input. For example, the lower the position in the LRU (i.e., the more recently used), the bigger the savings (or reduction in latency) may be as the blocks may be expelled much faster than in a conventional case. In some embodiments, when the multi-processor computing device is configured to proactively expel and push data to other data storage units (e.g., prefetch), savings may include the reduced latency of the eviction as well as the reduced latency of the push. In some embodiments, when the latency of bringing the data to a recipient data storage unit may be known, that latency cost may be subtracted as part of calculating the cost of evicting the data from a data storage unit.

In some embodiments, the multi-processor computing device may adjust the data transfer heuristic model to utilize the following adjusted power equation:

$$\text{power}(\text{size}) = \text{power}(\text{sender}) + \text{power}(\text{receiver}) \pm (X^*\text{size}^2) + (Y^*\text{size}) - \text{savings}(\text{size}),$$

wherein "power" "size", "sender", "receiver", "X" and "Y" are described herein, and "savings(size)" represents a measured power (energy) consumption savings. In some embodiments, the savings may also include a square coefficient in the power equation. In some cases, assuming no DVFS is active, savings may correspond to a reduction of idle time in a processor. The power formula may not require the multi-processor computing device to wait until data is evicted or otherwise becomes available to calculate a power cost. In some embodiments, a boot-up power cost may be computed at a boot time and the 'savings' term may be subtracted from the boot-up power cost.

The multi-processor computing device may repeat some of the operations of the method 300, such as by again calculating data transfer cost using data transfer heuristic model for each of a plurality of tasks to be executed via various processing units in block 304.

In some embodiments, the multi-processor computing device may re-calculate the data transfer costs for tasks in response to identifying new tasks to be executed by the multi-processor computing device. For example, the runtime functionality may refresh the estimated costs for all ready (or pending) tasks in response to a new task being scheduled for execution on a CPU. Alternatively, a new task order may be calculated in response to changes to the data transfer heuristic model. For example, in response to adjusting coefficients based on recently performed data transfers in association with an executing task, the multi-processor computing device may re-order the tasks for subsequent operations.

Figure 4:
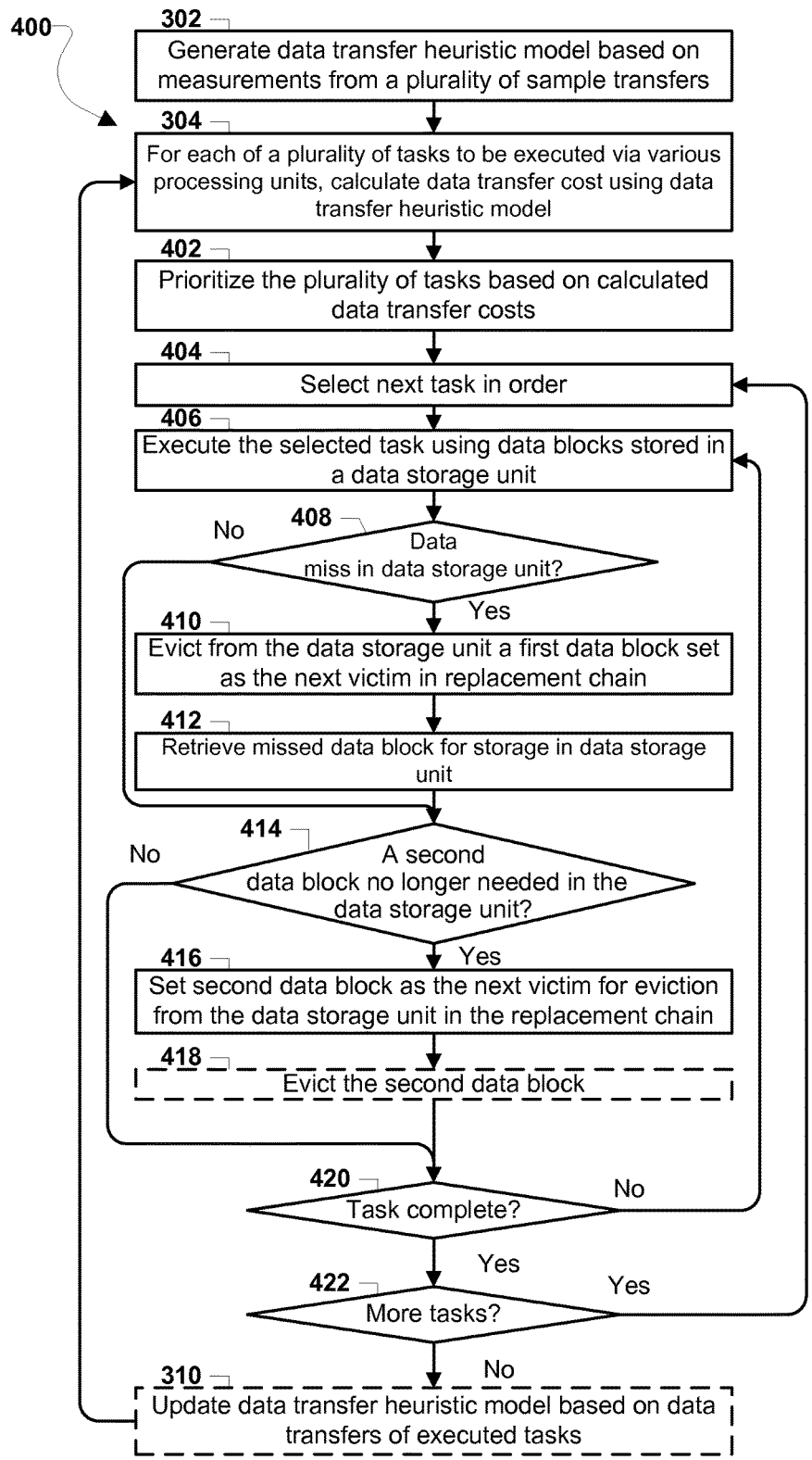
FIG. 4 is a process flow diagram illustrating an embodiment method performed by a computing device to configure a data block for early eviction from data storage.
Figure 5:
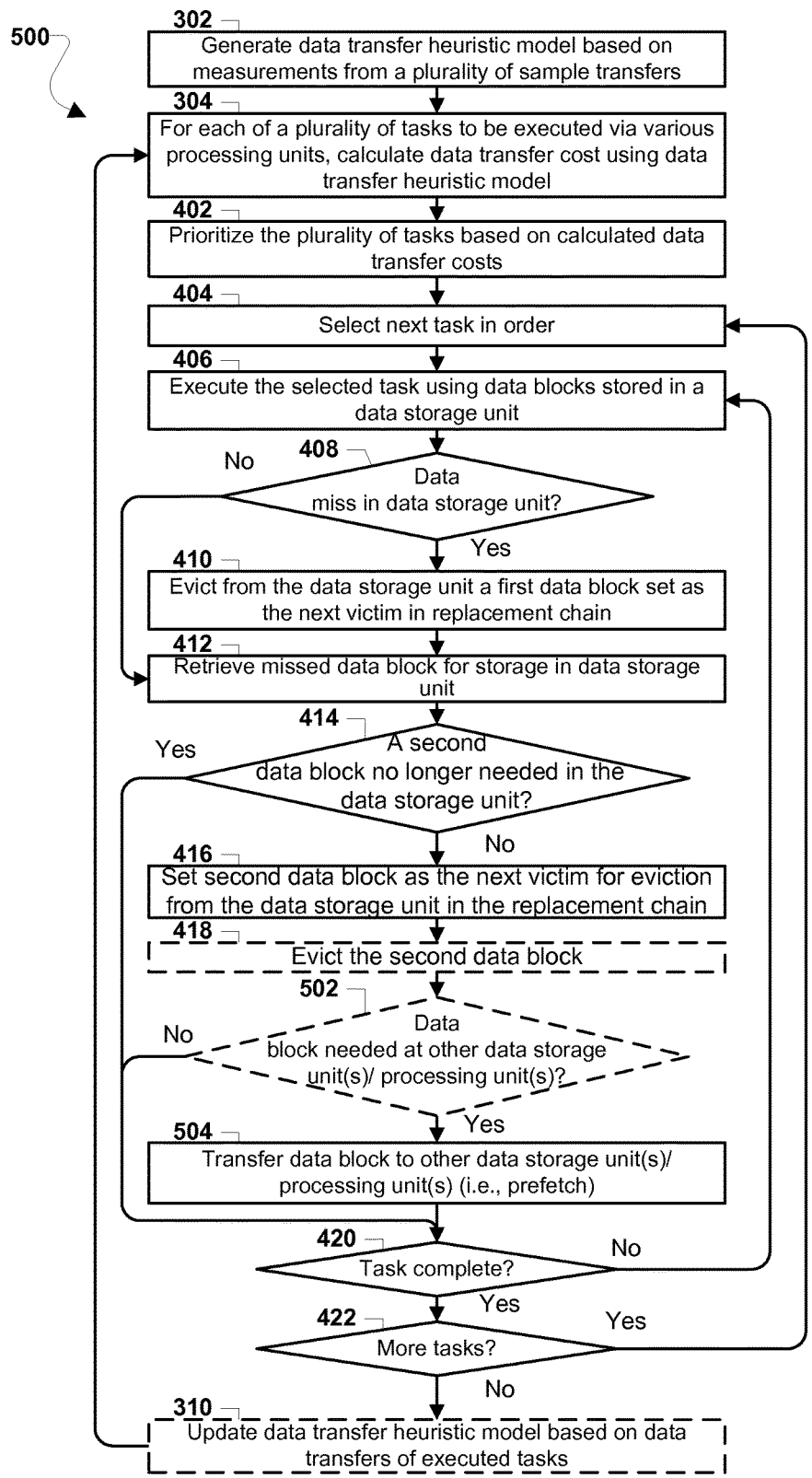
FIG. 5 is a process flow diagram illustrating an embodiment method performed by a computing device to transfer a data block used with a first task to a data storage for use with a second task (e.g., pre-fetch).

In some embodiments, prioritization operations may be used by the multi-processor computing device for setting the execution of various tasks based on data transfer costs (e.g., set a scheduling priority order). In some cases, such prioritization (e.g., sorting, etc.) may enable ready (or pending) tasks that may utilize similar data sets to efficiently share data without incurring data coherency problems. For simplicity, FIGS. 4-5 illustrate such prioritization operations (e.g., operations of block 402) in combination with early eviction operations and/or pre-fetching operations for tasks that may utilize common data sets. However, in some embodiments, such early eviction and/or pre-fetching operations may or may not require prioritization operations as described herein, and vice versa. For example, in some embodiments, the multi-processor computing device may prioritize (e.g., sort, etc.) various tasks executing on various processing units with or without also performing early eviction operations and/or pre-fetching operations.

FIG. 4 illustrates an embodiment method 400 performed by a multi-processor computing device to configure a data block for early eviction from a data storage unit (e.g., a storage location for a buffer). The operations of the method 400 may be similar to those of the method 300 of FIG. 3, except that the method 400 may include operations for determining whether data blocks are to be evicted from a data storage unit (e.g., cache, etc.) to allow other immediately required data to be loaded in the memory location for use executing a task. In general, in systems that do not utilize coherency support, when a task finishes execution, a cache may need to be flushed to ensure data is accessible to other processing units and/or tasks. Accordingly, in some embodiments, the multi-processor computing device may be configured to execute an early flush of particular data segments to avoid stalling for other tasks/processing units. For example, while still executing a first task on a processing unit, the multi-processor computing device may evict portions of a buffer after use with the first task so that a second task executing on another processing unit may begin using the evicted data without waiting (i.e., without delay due to memory subsystem actions). In some embodiments, API calls and/or compiler knowledge of a task may be used by the multi-processor computing device to indicate items that are no longer needed by the task and thus may be proactively flushed. With reference to FIGS. 1-4, various operations of the method 400 may be performed by a runtime functionality executing via a processor or processing unit of a multi-processor computing device, such as the CPU 102a of the mobile device 110.

The operations of blocks 302-304, and 310 may be similar to the operations of like numbered blocks described above with reference to FIG. 3. In response to performing the selection operations in block 304, the multi-processor computing device may prioritize the plurality of the tasks based on the calculated data transfer costs in block 402. As described herein, various prioritization or scheduling schemes using data transfer costs may be implemented, such as using a sorted queue, distributed queues, scheduling graphs, and/or any other scheduling abstraction to organize, sort, and/or otherwise prioritize tasks. In particular, the multi-processor computing device, such as via a runtime functionality or a scheduler functionality, may determine an order or sequence (i.e., a scheduling priority order) for executing a plurality of tasks on one or more of the processing units based on the dependencies of the tasks, the programmer-supplied data about the tasks (e.g., urgency), the state of the various data storage units, and/or the data transfer costs for moving required data in between various data storage units. For example, the computing device may identify the cost to transfer all needed data for each of a set of tasks ready to be performed, and may sort the tasks based on the identified costs (e.g., data transfer time and/or power (energy) consumption but not native abilities of the processing units of the computing device). Then, for each available processing unit, the computing device may assign an unassigned task having the lowest cost based on the sorting to be launched on the processing unit. In this way, the multi-processor computing device may place the plurality of tasks in a sequence for execution on various processing units and/or a timing order for concurrent execution on different processing units. In some embodiments, the multi-processor computing device may identify a sequence or scheduling priority order for executing various tasks such that tasks having a lower or the lowest estimated cost for data transfers (e.g., lowest time, power (energy) consumption) may be performed before those tasks having higher estimated costs. In some embodiments, the multi-processor computing device may identify a sequence or scheduling priority order for executing various tasks such that tasks having a higher or the highest estimated cost for data transfers (e.g., highest time, power (energy) consumption) may be performed before those tasks having lower estimated costs.

In block 404, the multi-processor computing device may select a next task in the order (i.e., the scheduling priority order), and in block 406 the multi-processor computing device may execute the selected task on a certain processing unit using data blocks stored in one or more data storage units associated or otherwise accessible by the certain processing unit (e.g., cache, shared memory, other data storage device, etc.). In some embodiments, the processing unit for executing the task may be determined based on data transfer costs, such as described with reference to FIG. 6.

While executing the task, the multi-processor computing device may determine whether there has (or will be) a data block miss with reference to an associated data storage unit in determination block 408. A data block miss may occur when the task requires a data segment that is not currently loaded or otherwise stored within the data storage unit (e.g., the processing unit's cache, etc.). In such a case, the processing unit executing the task may retrieve the missing data block from another data storage unit (e.g., from memory, from disk, from another section of addresses, etc.).

In response to determining that there has (or will be) a data block miss with reference to the associated data storage unit (i.e., determination block 408="Yes"), the multi-processor computing device may evict from the data storage unit a first data block set as the next victim in replacement chain in block 410. For example, a cache may evict a predefined data block when a new data block from memory is required for an operation of the currently executing task. The replacement chain may be a list, pointer, or other data structure used by the multi-processor computing device for identifying the next data block to be removed. In some embodiments, the replacement chain may be controlled by a cache replacement policy for the processing unit.

In block 412, the multi-processor computing device may retrieve the missed data block for storage in the data storage unit, such as by loading the missed block from system memory, etc.

In response to determining that there has not been (or will not be) a data block miss with reference to the associated data storage unit (i.e., determination block 408="No"), or in response to performing the retrieving operations in block 412, the multi-processor computing device may determine whether a data block (e.g., a second block) is no longer needed in the data storage unit (e.g., for the current task or other tasks using the data storage unit) in determination block 414. Such a determination may be made based on an analysis of the task's code, runtime data available, and/or by using compiler support. For example, determination of whether a first data block within the first data storage unit associated with a first processing unit is no longer needed during execution of the first task may be based on compiler information, an application programming interface (API) call set by a programmer within code of the first task, or both.

In response to determining that a second data block is no longer needed in the data storage unit (i.e., determination block 414="Yes"), the multi-processor computing device may set the second data block as the next victim data block for eviction from the data storage unit in the replacement chain (e.g., of a cache replacement policy) in block 416. For example, with compiler support or at the end of task execution, the multi-processor computing device (e.g., via the runtime functionality) may be configured to change the position of the second data block in the replacement chain to ensure an early eviction. By early evicting the second data block, the multi-processor computing device may provide a preventive action that improves the waiting time another task may incur when a data transfer of the second data block is required. For example, another task may not have to wait for a flush of the second data block prior to a data transfer that provides the second data block for use with the another task. In some embodiments, the multi-processor computing device may include hardware that enables per address cache block flushing.

In some embodiments, when the data storage unit is a driver-managed data structure associated with the first processing unit, a custom software-managed data store, or a custom hardware managed data store, eviction operations may include determining whether any new driver-managed data is needed within the data storage unit for use with a task. In such a case, the multi-processor computing device may evict a data block from the data storage unit in response to determining that there is insufficient storage space for the new driver-managed data in the data storage unit.

In optional block 418, the multi-processor computing device may evict the second data block, such as by immediately evicting the second data block. In response to determining that a second data block is still needed in the data storage unit (i.e., determination block 414="No"), or in response to performing the eviction operations in optional block 418, the multi-processor computing device may determine whether the task is complete in determination block 420. In response to determining that the task is not complete (i.e., determination block 420="No"), the multi-processor computing device may continue the execution operations in block 406.

In response to determining that the task is complete (i.e., determination block 420="Yes"), the multi-processor computing device may determine whether there are more tasks to process in determination block 422, such as subsequent tasks to perform in the order identified based on the prioritization operations. In response to determining that there are more tasks to process (i.e., determination block 422="Yes"), the multi-processor computing device may select a next task in order in block 404. In response to determining that there are no more tasks to process (i.e., determination block 422="No"), the multi-processor computing device may update the transfer heuristic model based on the date transfers of executed tasks in optional block 310, and repeat some of the operations of the method 400, such as by again calculating data transfer cost using data transfer heuristic model for each of a plurality of tasks to be executed via various processing units in block 304.

FIG. 5 illustrates an embodiment method 500 performed by a multi-processor computing device to transmit a data block in between data storage unit(s) and/or processing unit(s) to pre-fetch data used by tasks. The operations of the method 500 may be similar to those of the method 300 (FIG. 3) and method 400 (FIG. 4), except that the method 500 may include operations for performing pre-fetching to enable tasks associated with other data storage units to access data in an efficient manner. For example, when the multi-processor computing device has decided a second task may be the next task to use a certain data block currently stored in a first data storage unit (e.g., with or without compiler support), the multi-processor computing device may evict the data block from the first data storage unit and send the data block to a second data storage unit so the second task may already have the data block allocated at the beginning of the execution of the second task. In some embodiments, the multi-processor computing device may also trigger the pre-fetching of required instructions since each task may be a "closure." For example, the multi-processor computing device may also trigger the pre-fetch of required instructions as a task may be a "function closure," such as with Qualcomm's MARE, Open Computing Language (OpenCL), and/or other runtimes. In this way, other processing units executing tasks may avoid having to wait to populate associated data and instructions storage units, and instead may simply benefit from having pre-fetched data and instructions transferred once used by another processing unit or from memory. Various operations of the method 500 may be performed by a runtime functionality executing via a processor or processing unit of a multi-processor computing device, such as the CPU 102a of the mobile device 110 described with reference to FIG. 1.

The operations of blocks 302-304, 310 may be similar to the operations of like numbered blocks described above with reference to FIG. 3 and the operations of blocks 402-422 may be similar to the operations of like numbered blocks described above with reference to FIG. 4. In response to performing the evicting operations of optional block 418, the multi-processor computing device may determine whether the data block is needed at another data storage unit and/or processing unit in determination block 502. Such a determination may be made based on an analysis of the task's code, using compiler support, and/or runtime data available.

In response to determining that the data block is needed at other data storage unit(s) and/or processing unit(s) (i.e., determination block 502="Yes"), the multi-processor computing device may transfer data block to the other data storage unit(s) and/or processing unit(s) in block 504. In other words, the data block may be pre-fetched for use via the other data storage unit(s)/processing unit(s). In some embodiments, the multi-processor computing device may multicast the data block to more than one destination data storage unit. For example, based on the type of buffer usage for other processing units (e.g., read-only) and/or the capabilities of the multi-processor computing device, the multi-processor computing device may multicast a particular data block to one or more data storage units for use with other tasks. In some embodiments, the multi-processor computing device may evaluate a task graph (e.g., the task graph of FIG. 2A) to identify eligible multicast recipients.

In response to determining that the data block is not needed at other data storage unit(s) and/or processing unit(s) (i.e., determination block 502="No"), or in response to performing the operations of block 504, the multi-processor computing device may repeat the operations of blocks 404 through 422 until all tasks are complete (i.e., determination block 422="No") at which point the multi-processor computing device may update the transfer heuristic model based on the date transfers of executed tasks in optional block 310, and repeat some of the operations of the method 500, such as by again calculating data transfer cost using data transfer heuristic model for each of a plurality of tasks to be executed via various processing units in block 304.

Figure 6:
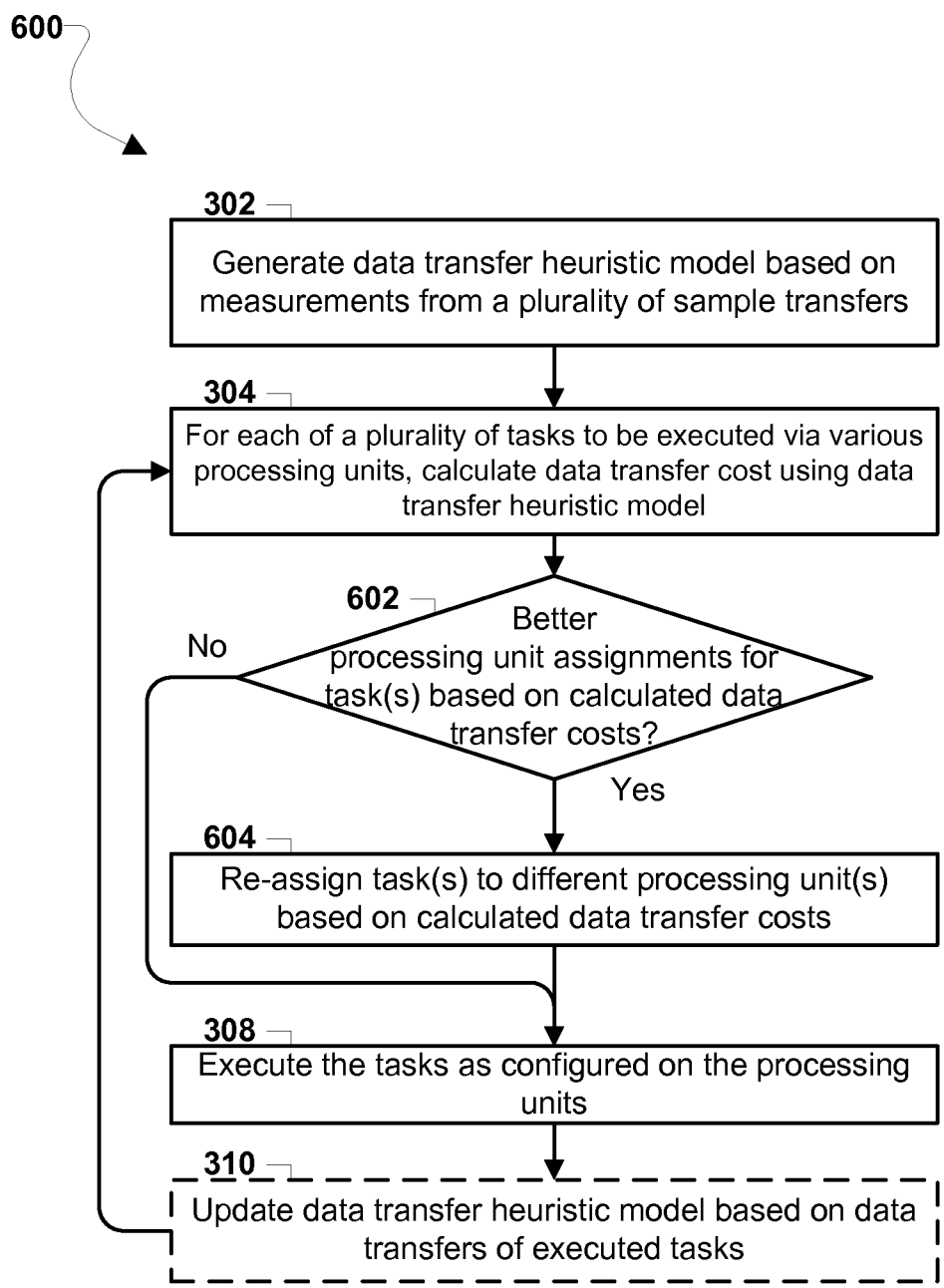
FIG. 6 is a process flow diagram illustrating an embodiment method performed by a computing device to re-assign tasks to various processing units based on calculated data transfer costs.

FIG. 6 illustrates an embodiment method 600 performed by a multi-processor computing device to re-assign tasks to various processing units based on calculated data transfer costs. The operations of the method 600 may be similar to those of the method 300 of FIG. 3, except that the method 600 may include operations for re-assigning tasks originally associated with a first processing unit to another processing unit based on data transfer calculations. In general, some tasks may be general processing tasks configured to be executed on one of a plurality of the processing units of the multi-processor computing device (e.g., polymorphic tasks). At runtime for such a task, the multi-processor computing device may use the estimated data transfer costs for performing the tasks on all applicable processing units, such that the processing unit associated with the lowest calculated data transfer cost may be assigned the task. Various operations of the method 600 may be performed by a runtime functionality executing via a processor or processing unit of a multi-processor computing device, such as the CPU 102a of the mobile device 110 described with reference to FIG. 1.

The operations of blocks 302-304, 308-310 may be similar to the operations of like numbered blocks described above with reference to FIG. 3. Using the data transfer costs calculated in block 304, the multi-processor computing device may determine whether there are better processing unit(s) (or better processing unit assignment(s)) for performing task(s) based on calculated data transfer costs in determination block 602.

In response to determining that there are better processing unit(s) for performing the task(s) based on the calculated data transfer costs (i.e., determination block 602="Yes"), the multi-processor computing device may re-assign the task(s) to the different processing unit(s) based on the calculated data transfer costs in block 604. For example, the multi-processor computing device may move the task to another task queue. In some embodiments, device re-assignment may be performed statically at compile time or dynamically at runtime.

In response to determining that there are not better processing unit(s) for performing the task(s) based on the calculated data transfer costs (i.e., determination block 602="No"), or using the re-assigned tasks determine in block 604, the multi-processor computing device may execute the tasks as configured on the processing units in block 308. The multi-processor computing device may update the transfer heuristic model based on the date transfers of executed tasks in optional block 310, and repeat some of the operations of the method 600, such as by again calculating data transfer cost using data transfer heuristic model for each of a plurality of tasks to be executed via various processing units in block 304.

In some embodiments, a task graph of polymorphic tasks may be known at compile time, and therefore the multi-processor computing device may select a processing unit to execute the task at compile time. In some embodiments, the multi-processor computing device may be configured to traverse a task queue of polymorphic tasks to select the order that may minimize the data transfer for the current tasks.

The multi-processor computing device may be configured to support parallel processing environments or scenarios in which performance may be improved by dividing work items across multiple processing units and/or tasks in order to overlap computations. For example, multiple processing units/tasks may be used to perform parallel loop executions on different data simultaneously. Accordingly, in some embodiments, the multi-processor computing device may perform the operations in blocks 602-604 of the method 600 in order to select a processing unit for processing a task configured for use in parallel processing of a cooperative processing effort by more than one task/processing unit (e.g., a parallel loop).

In some embodiments, when the multi-processor computing device is configured to support work-stealing protocols in parallel processing efforts, tasks that have completed individually-assigned workloads may be configured to opportunistically steal work items from other tasks/processing units. In such cases, the multi-processor computing device may further determine victim tasks from which another tasks may "steal" work items for processing based on the data transfer cost calculations. For example, the multi-processor computing device (e.g., via the runtime functionality) may calculate the costs for transferring data from various processing units participating in a cooperative processing effort in order to identify the victim task that may lose work items to another task/processing unit. In some embodiments, the multi-processor computing device may also use the data transfer heuristic model to calculate how much data to steal from victim tasks/processing units. For example, once a victim task is identified based on a first data transfer cost calculation, the multi-processor computing device may perform various other cost calculations for different amounts of work to be transferred to determine the maximum amount of work to steal without exceeding a data transfer cost threshold.

Figure 7:
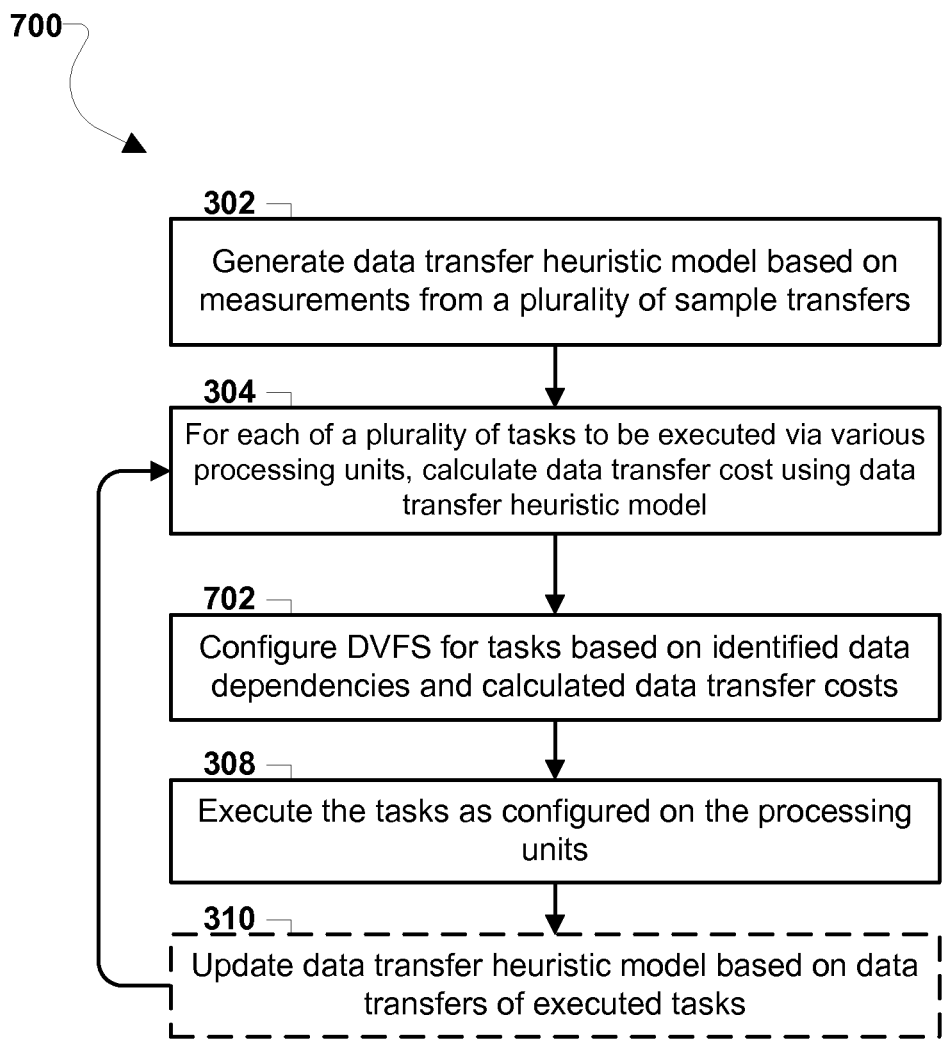
FIG. 7 is a process flow diagram illustrating an embodiment method performed by a computing device to configure voltage/frequency settings used with regard to tasks based at least on calculated data transfer costs.

FIG. 7 is a process flow diagram illustrating an embodiment method performed by a multi-processor computing device to configure voltage/frequency settings used with regard to tasks based on calculated data transfer costs and task dependencies. The operations of the method 700 may be similar to those of the method 300 of FIG. 3, except that the method 700 may include operations for adjusting various DVFS settings associated with individual tasks. For example, based on the urgency/criticality of a task, the multi-processor computing device may configure the execution of the task to use a voltage or frequency that is lower or higher than a default setting. Various operations of the method 700 may be performed by a runtime functionality executing via a processor or processing unit of a multi-processor computing device, such as the CPU 102a of the mobile device 110 as described with reference to FIG. 1.

The operations of blocks 302 and 304 may be similar to the operations of like numbered blocks of the method 300 described above with reference to FIG. 3. Using the data transfer costs calculated in block 304, the multi-processor computing device may configure DVFS settings for tasks based on identified data dependencies and calculated data transfer costs in block 702. For example, when a particular task has no dependencies (i.e., no other tasks are reliant upon the data currently associated with, stored at, being processed by the task), the multi-processor computing device may configure DVFS settings for the task to be low, allowing data to be transmitted to a data storage unit used by the task to utilize a slower frequency that may save power (energy) consumption. As another example, when a particular task has one or more dependencies (i.e., successor tasks), the multi-processor computing device may configure DVFS settings for the task to be high, allowing the task to receive data faster, enabling faster turnaround for the successor tasks. DVFS settings may control bus and/or core use (e.g., speed of task execution on a core, etc.) based on data transfer costs.

As conventional DVFS algorithms/protocols may be "blind" with regard to predictive data indicating future requirements of processors, in some embodiments, the urgency and/or criticality of each task may be determined based on an identified number of successors for the task and/or additional information from the programmer, such as provided within code of the task, an API call, etc. In some embodiments, the multi-processor computing device may select the DVFS settings for a plurality of tasks such that data transfer times are normalized for each. For example, if several data sets have to be copied to several processing units/devices and there is a global synchronization element, the synchronization element may prevent any processing units/devices from continuing until all processing units/devices have reached the element, and so the multi-processor computing device (e.g., via the runtime functionality) may calculate DVFS settings for each that provide equalized arrival times to all, minimizing waiting (and power (energy) consumption). In some embodiments, the generation of data transfer heuristic model data in block 302 may include estimations of voltage and/or frequency, such as provided as inputs for sample transfers, etc.

With the DVFS configured to tasks in block 702, multi-processor computing device may execute the tasks as configured on the processing units based in block 308. The multi-processor computing device may update the transfer heuristic model based on the date transfers of executed tasks in optional block 310, and repeat some of the operations of the method 600, such as by again calculating data transfer cost using data transfer heuristic model for each of a plurality of tasks to be executed via various processing units in block 304.

Figure 8:
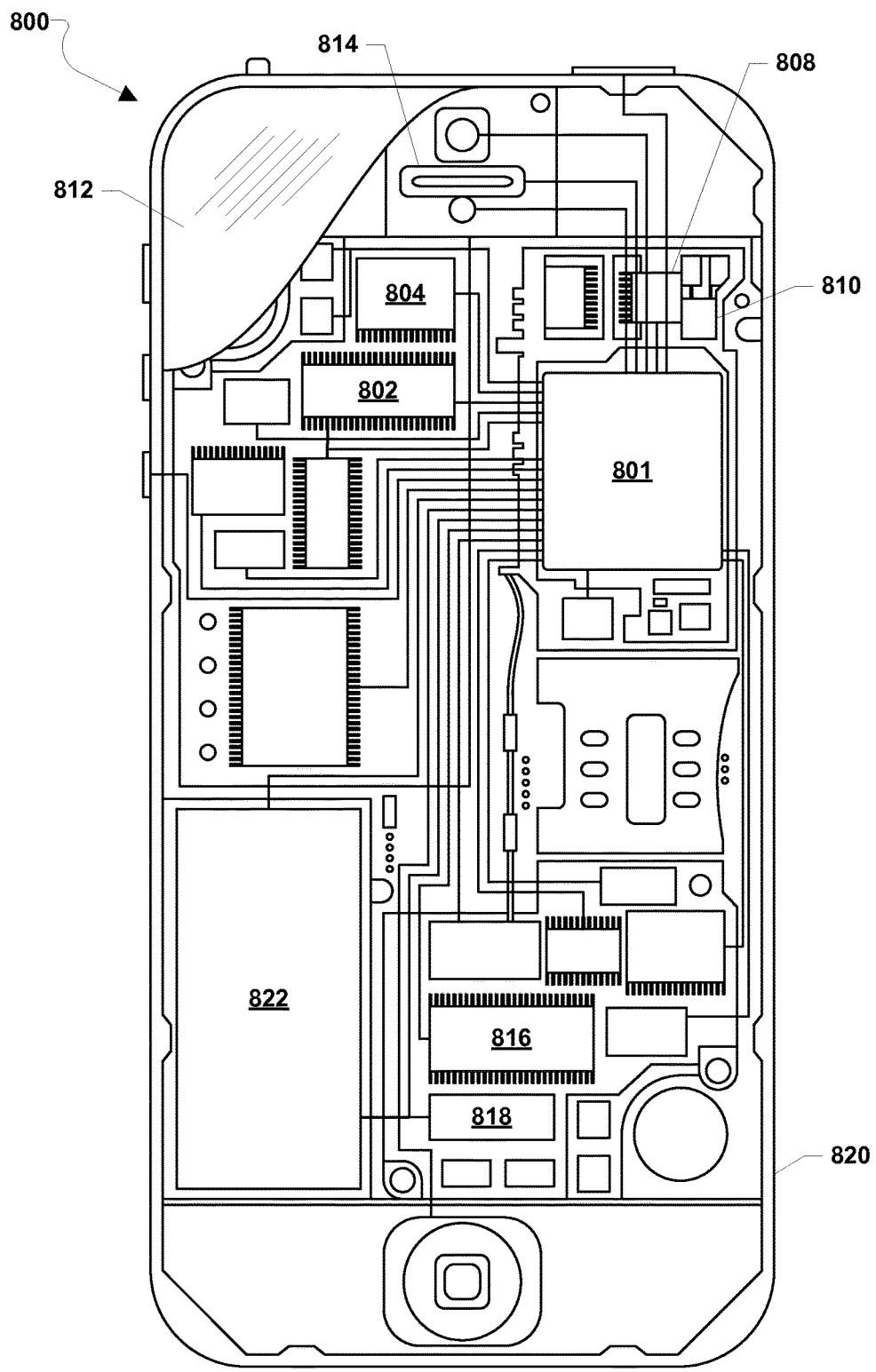
FIG. 8 is a component block diagram of a computing device suitable for use in some embodiments.

Various forms of computing devices, including personal computers, mobile devices, and laptop computers, may be used to implement the various embodiments. Such computing devices may typically include the components illustrated in FIG. 8 which illustrates an example multi-processor mobile device 800. In various embodiments, the mobile device 800 may include a processor 801 coupled to a touch screen controller 804 and an internal memory 802. The processor 801 may be one or more multi-core ICs designated for general or specific processing tasks. In some embodiments, other processing units may also be included and coupled to the processor 801. The internal memory 802 may be volatile and/or non-volatile memory, and may also be secure and/or encrypted memory, or unsecure and/or unencrypted memory, or any combination thereof. The touch screen controller 804 and the processor 801 may also be coupled to a touch screen panel 812, such as a resistive-sensing touch screen, capacitive-sensing touch screen, infrared sensing touch screen, etc. The mobile device 800 may have one or more radio signal transceivers 808 (e.g., Bluetooth®, ZigBee®, Wi-Fi®, radio frequency (RF) radio, etc.) and antennae 810, for sending and receiving, coupled to each other and/or to the processor 801. The transceivers 808 and antennae 810 may be used with the above-mentioned circuitry to implement the various wireless transmission protocol stacks and interfaces. The mobile device 800 may include a cellular network wireless modem chip 816 that enables communication via a cellular network and is coupled to the processor. The mobile device 800 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The mobile device 800 may also include speakers 814 for providing audio outputs. The mobile device 800 may also include a housing 820, constructed of a plastic, metal, or a combination of materials, for containing all or some of the components discussed herein. The mobile device 800 may include a power source 822 coupled to the processor 801, such as a disposable or rechargeable battery. The rechargeable battery may also be coupled to the peripheral device connection port to receive a charging current from a source external to the mobile device 800.

The various processors described herein may be any programmable microprocessor, microcomputer or multiple processor chip or chips that may be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic data storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray Disc® where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the embodiment techniques of the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for data management in a computing device utilizing a plurality of processing units, comprising:
   generating a data transfer heuristic model based on measurements from a plurality of sample data transfers between a plurality of data storage units;
   calculating data transfer costs for each of a plurality of tasks using the generated data transfer heuristic model;
   configuring the plurality of tasks to be performed on the plurality of processing units based at least on the calculated data transfer cost by prioritizing the plurality of tasks to obtain a scheduling priority order;
   executing a first task in the scheduling priority order on a first processing unit;
   determining whether a first data block within a first data storage unit associated with the first processing unit is no longer needed during execution of the first task; and
   evicting the first data block from the first data storage unit in response to determining that the first data block is no longer needed during the execution of the first task.

2. The method of claim 1, wherein the measurements include one of time measurements, power consumption measurements, or time and power consumption measurements.

3. The method of claim 1, wherein generating the data transfer heuristic model based on the measurements from the plurality of sample data transfers between the plurality of data storage units comprises adjusting a coefficient of a formula that calculates an estimated cost.

4. The method of claim 3, wherein the formula calculates one of an estimated time cost, an estimated power consumption cost, or both an estimated time cost and an estimated power consumption cost.

5. The method of claim 1, further comprising:
   executing each of the plurality of tasks as configured on one of the plurality of processing units; and
   updating the data transfer heuristic model based on measurements of data transfers occurring during executions of the plurality of tasks.

6. The method of claim 1, wherein generating the data transfer heuristic model occurs at a boot-up time for the computing device or periodically.

7. The method of claim 1, wherein generating the data transfer heuristic model includes using embedded power monitoring capabilities of the computing device.

8. The method of claim 1, wherein calculating the data transfer costs for each of the plurality of tasks using the generated data transfer heuristic model comprises querying the data transfer heuristic model using a data transfer size, a source identity, and a destination identity.

9. The method of claim 8, wherein querying the data transfer heuristic model is performed via an application programming interface (API) call.

10. The method of claim 1, wherein calculating the data transfer costs for each of the plurality of tasks using the generated data transfer heuristic model comprises identifying data dependencies between the plurality of tasks.

11. The method of claim 10, wherein the data dependencies are provided via a scheduler.

12. The method of claim 1, wherein determining whether the first data block within the first data storage unit associated with the first processing unit is no longer needed during execution of the first task is based on compiler information, an application programming interface (API) call within code of the first task, or both.

13. The method of claim 1, wherein evicting the first data block from the first data storage unit in response to determining that the first data block is no longer needed during the execution of the first task comprises:
   setting the first data block as a next victim data block in a replacement chain of a cache replacement policy associated with the first processing unit;
   detecting a data block miss corresponding to a second data block; and
   evicting the first data block from the first data storage unit in response to detecting the data block miss and based on the cache replacement policy.

14. The method of claim 13, further comprising:
   determining whether the first data block is needed for performing a second task in the scheduling priority order, wherein the second task is performed by a second processing unit associated with a second data storage unit; and
   transferring the first data block to the second data storage unit in response to determining that the first data block is needed for performing the second task and upon eviction from the first data storage unit.

15. The method of claim 1, wherein evicting the first data block from the first data storage unit in response to determining that the first data block is no longer needed during the execution of the first task comprises:
   setting the first data block as a next victim data block in the first data storage unit;
   identifying that new driver-managed data is needed within the first data storage unit for use with the first task;
   determining whether there is insufficient storage space in the first data storage unit for the identified new driver-managed data; and
   evicting the first data block from the first data storage unit in response to determining that there is insufficient storage space for the new driver-managed data in the first data storage unit.

16. The method of claim 15, where the first data storage unit is a driver-managed data structure associated with the first processing unit, a custom software-managed data store, or a custom hardware managed data store.

17. The method of claim 1, wherein configuring the plurality of tasks to be performed on the plurality of processing units based at least on the calculated data transfer costs further comprises:
   determining whether there is a better processing unit for executing a second task based on the calculated data transfer costs, wherein the second task is already configured to execute on a first processing unit; and
   re-assigning the second task to be executed by a second processing unit in response to determining that there is a better processing unit.

18. The method of claim 1, wherein configuring the plurality of tasks to be performed on the plurality of processing units further comprises configuring dynamic voltage and frequency scaling (DVFS) settings for processing units executing each of the plurality of tasks based on the calculated data transfer costs.

19. The method of claim 18, wherein the DVFS settings control a use of a processing unit, a use of a bus, or a combination of both.

20. A computing device, comprising:
   a memory; and
   a processor of a plurality of processing units, wherein the processor is coupled to the memory and is configured with processor-executable instructions to perform operations comprising:
      generating a data transfer heuristic model based on measurements from a plurality of sample data transfers between a plurality of data storage units;
      calculating data transfer costs for each of a plurality of tasks using the generated data transfer heuristic model;
      configuring the plurality of tasks to be performed on the plurality of processing units based at least on the calculated data transfer costs, wherein configuring the plurality of tasks comprises prioritizing the plurality of tasks to obtain a scheduling priority order;
      executing a first task in the scheduling priority order on a first processing unit determining whether a first data block within a first data storage unit associated with the first processing unit is no longer needed during execution of the first task; and
      evicting the first data block from the first data storage unit in response to
      determining that the first data block is no longer needed during the execution of the first task.

21. The computing device of claim 20, wherein the measurements include one of time measurements, power consumption measurements, or time and power consumption measurements.

22. The computing device of claim 20, wherein the processor is configured with processor-executable instructions to perform operations such that generating the data transfer heuristic model based on the measurements from the plurality of sample data transfers between the plurality of data storage units comprises adjusting a coefficient of a formula that calculates an estimated cost.

23. The computing device of claim 20, wherein the processor is configured with processor-executable instructions to perform operations further comprising:
   executing each of the plurality of tasks as configured on one of the plurality of processing units; and
   updating the data transfer heuristic model based on measurements of data transfers occurring during executions of the plurality of tasks.

24. The computing device of claim 20, wherein the processor is configured with processor-executable instructions to perform operations such that calculating the data transfer costs for each of the plurality of tasks using the generated data transfer heuristic model comprises querying the data transfer heuristic model using a data transfer size, a source identity, and a destination identity.

25. A computing device, comprising:
   means for generating a data transfer heuristic model based on measurements from a plurality of sample data transfers between a plurality of data storage units;
   means for calculating data transfer costs for each of a plurality of tasks using the generated data transfer heuristic model;
   means for configuring the plurality of tasks to be performed on a plurality of processing units based at least on the calculated data transfer costs, wherein the means for configuring the plurality of tasks comprises means for prioritizing the plurality of tasks to obtain a scheduling priority order;
   means for executing a first task in the scheduling priority order on a first processing unit;
   means for determining whether a first data block within a first data storage unit associated with the first processing unit is no longer needed during execution of the first task; and
   means for evicting the first data block from the first data storage unit in response to determining that the first data block is no longer needed during the execution of the first task.

26. A non-transitory processor-readable storage medium having stored thereon processor-executable instructions configured to cause a processor of a computing device to perform operations comprising:
   generating a data transfer heuristic model based on measurements from a plurality of sample data transfers between a plurality of data storage units;
   calculating data transfer costs for each of a plurality of tasks using the generated data transfer heuristic model;

configuring the plurality of tasks to be performed on a plurality of processing units based at least on the calculated data transfer costs, wherein configuring the plurality of tasks comprises prioritizing the plurality of tasks to obtain a scheduling priority order;

executing a first task in the scheduling priority order on a first processing unit;

determining whether a first data block within a first data storage unit associated with the first processing unit is no longer needed during execution of the first task; and evicting the first data block from the first data storage unit in response to determining that the first data block is no longer needed during the execution of the first task.

* * * * *